United States Patent
Dallal et al.

(10) Patent No.: US 11,576,061 B2
(45) Date of Patent: Feb. 7, 2023

(54) BEAM REPORT FOR MULTI-STREAM COMMUNICATION

(71) Applicant: QUALCOMM Incorporated, San Diego, CA (US)

(72) Inventors: Yehonatan Dallal, Kfar Saba (IL); Ran Berliner, Kfar-Aviv (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/069,515

(22) Filed: Oct. 13, 2020

(65) Prior Publication Data

US 2022/0116801 A1 Apr. 14, 2022

(51) Int. Cl.
*H04W 24/08* (2009.01)
*H04B 17/318* (2015.01)
(Continued)

(52) U.S. Cl.
CPC .......... *H04W 24/08* (2013.01); *H04B 7/0617* (2013.01); *H04B 17/318* (2015.01); *H04B 17/336* (2015.01)

(58) Field of Classification Search
CPC ... H04W 24/08; H04B 17/318; H04B 17/336; H04B 7/0617
See application file for complete search history.

(56) References Cited

U.S. PATENT DOCUMENTS

2018/0048375 A1* 2/2018 Guo .................... H04B 17/309
2019/0116605 A1* 4/2019 Luo ........................ H04B 7/024
(Continued)

FOREIGN PATENT DOCUMENTS

WO 2020057383 A1 3/2020

OTHER PUBLICATIONS

Catt: "Discussion on DL Beam Management", 3GPP TSG RAN WG1 Meeting #89, 3GPP Draft; R1-1707475, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017 (May 14, 2017), XP051272683, 10 pages, Retrieved from the Internet: URL: http://www.3gpp.org/ftp/Meetings_3GPP_SYNC/RAN1/Docs/ [retrieved on May 14, 2017], figure 3 p. 5.
(Continued)

*Primary Examiner* — Duc C Ho
(74) *Attorney, Agent, or Firm* — Loza & Loza, LLP/Qualcomm Incorporated

(57) ABSTRACT

Aspects relate to beam management in multi-stream communication between a radio access network (RAN) entity and a user equipment (UE). The RAN entity may transmit a plurality of transmit beams from a plurality of transmission and reception points (TRPs) associated with the RAN entity to the UE. For each of the transmit beams, the UE may obtain a beam quality metric on each of a plurality of receive beams of the UE during a measurement period (e.g., in parallel or serially) to generate a respective beam quality metric vector for each of the transmit beams. The UE can then transmit a beam report including the respective beam quality metric vector for each of the transmit beams to the RAN entity. The RAN entity may then select at least two beam pair links, each associated with a respective TRP, for spatial division multiplexing of at least two streams to the UE based on the beam report.

66 Claims, 17 Drawing Sheets

(51) Int. Cl.
*H04B 17/336* (2015.01)
*H04B 7/06* (2006.01)

(56) References Cited

U.S. PATENT DOCUMENTS

| | | | |
|---|---|---|---|
| 2019/0191346 A1* | 6/2019 | Han | H04W 36/0085 |
| 2019/0334603 A1 | 10/2019 | Venugopal et al. | |
| 2020/0228182 A1 | 7/2020 | Nilsson et al. | |
| 2021/0036800 A1* | 2/2021 | Berliner | H04W 36/06 |

OTHER PUBLICATIONS

International Search Report and Written Opinion—PCT/US2021/050970—ISA/EPO—dated Jan. 4, 2022.

\* cited by examiner

| L1 Measurement Report | |
|---|---|
| CRI 1 | BQM-A Vector 1 |
| CRI 2 | BQM-A Vector 2 |
| CRI 3 | BQM-A Vector 3 |
| CRI 4 | BQM-A Vector 4 |
| CRI 1 | BQM-B Vector 1 |
| CRI 2 | BQM-B Vector 2 |
| CRI 3 | BQM-B Vector 3 |
| CRI 4 | BQM-B Vector 4 |

FIG. 10B

| L1 Measurement Report | |
|---|---|
| CRI 1 | BQM Vector 1 |
| CRI 2 | BQM Vector 2 |
| CRI 3 | BQM Vector 3 |
| CRI 4 | BQM Vector 4 |

FIG. 10A

BEAM REPORT FOR MULTI-STREAM COMMUNICATION

INTRODUCTION

The technology discussed below relates generally to wireless communication networks, and more particularly, to beam measurement reporting in beam-based communication scenarios.

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The base station and the UE can select one or more beam pair links (BPLs) for communication therebetween on the downlink and/or the uplink. Each BPL includes corresponding transmit and receive beams on the base station and UE. Selection of BPL(s) may occur, for example, during initial acquisition of a cell, during cell reselection, upon detecting a beam failure, or during beam tracking. In one example, to select one or more beams for communication between a base station and a UE, the base station may transmit a reference signal, such as a synchronization signal block (SSB) or a channel state information (CSI) reference signal (CSI-RS), on a plurality of transmit beams in a beam sweeping manner. The UE can perform one or more measurements of the transmit beams and return a Layer 1 (L1) measurement report including the beam measurements of one or more of the measured beams. For example, the beam measurements may include a reference signal received power (RSRP) or signal-to-interference-plus-noise ratio (SINR).

To increase the data rate on the downlink, multiple BPLs can be used to facilitate spatial multiplexing of multiple data streams from the base station to the UE. At the UE, the different BPLs can include receive beams from the same antenna panel or different antenna panels. At the base station, the different BPLs can include transmit beams from different transmission and reception points (TRPs), which may be collocated or non-collocated.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment (UE) in a wireless communication network is disclosed. The method can include receiving each transmit beam of a plurality of transmit beams from a corresponding one of a plurality of transmission and reception points (TRPs) on each of a plurality of receive beams of the UE, and for each of the plurality of transmit beams, obtaining a beam quality metric on each of the plurality of receive beams during a measurement period to produce a respective beam quality metric vector for each of the plurality of transmit beams. The method can further include transmitting, to a radio access network (RAN) entity associated with the plurality of TRPs, a beam report including the respective beam quality metric vector for each of the plurality of transmit beams.

Another example provides a UE configured for wireless communication including a memory and a processor coupled to the memory. The processor and the memory can be configured to receive each transmit beam of a plurality of transmit beams from a corresponding one of a plurality of transmission and reception points (TRPs) on each of a plurality of receive beams of the UE, and for each of the plurality of transmit beams, obtain a beam quality metric on each of the plurality of receive beams during a measurement period to produce a respective beam quality metric vector for each of the plurality of transmit beams. The processor and the memory can further be configured to transmit, to a radio access network (RAN) entity associated with the plurality of TRPs, a beam report including the respective beam quality metric vector for each of the plurality of transmit beams.

In another example, method for wireless communication at a radio access network (RAN) entity in a wireless communication network is disclosed. The method can include transmitting each of a plurality of transmit beams from a corresponding one of a plurality of transmission and reception points (TRPs) associated with the RAN entity to a user equipment (UE), and receiving a beam report from the UE. The beam report can include, for each of the plurality of transmit beams, a respective beam quality metric vector including a respective beam quality metric obtained during a measurement period on each of a plurality of receive beams of the UE. The method can further include selecting at least two beam pair links, each including a respective transmit beam of the plurality of transmit beams and a respective receive beam of the plurality of receive beams and each associated with a different respective TRP of the plurality of TRPs, for spatial division multiplexing of at least two streams to the UE based on the beam report.

Another example provides a RAN entity configured for wireless communication including a memory and a processor coupled to the memory. The processor and the memory can be configured to transmit each of a plurality of transmit beams from a corresponding one of a plurality of transmission and reception points (TRPs) associated with the RAN entity to a user equipment (UE), and receive a beam report from the UE. The beam report can include, for each of the plurality of transmit beams, a respective beam quality metric vector including a respective beam quality metric obtained during a measurement period on each of a plurality of receive beams of the UE. The processor and the memory can further be configured to select at least two beam pair links, each including a respective transmit beam of the plurality of transmit beams and a respective receive beam of the plurality of receive beams and each associated with a different respective TRP of the plurality of TRPs, for spatial division multiplexing of at least two streams to the UE based on the beam report These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects, such exemplary aspects can be implemented in various devices, systems, and methods.

BRIEF DESCRIPTION OF THE DRAWINGS

FIGS. 10A and 10B are diagrams illustrating examples of a beam report including beam quality metric vectors according to some aspects.

DETAILED DESCRIPTION

Figure 1:
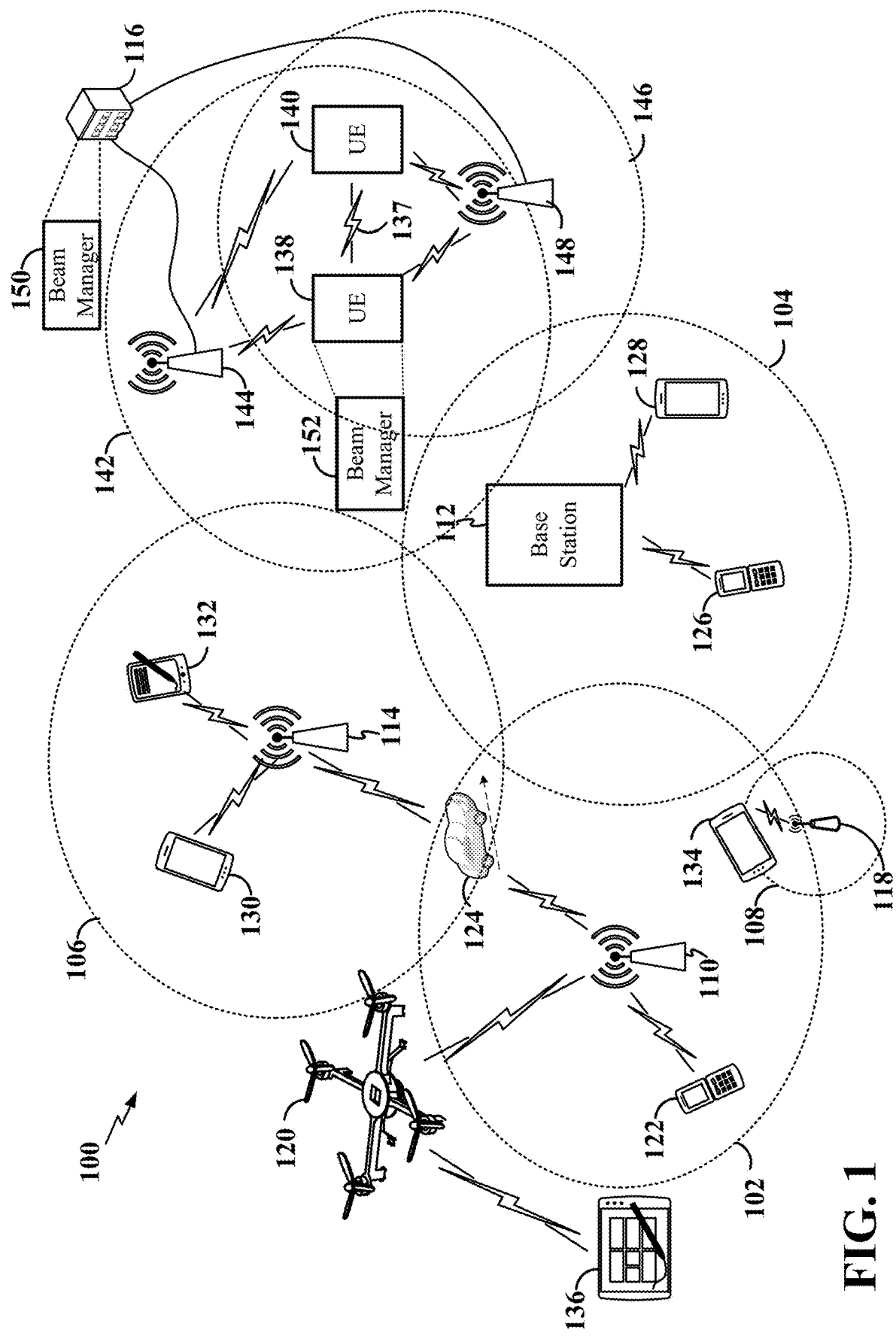
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and features are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, aspects and/or uses may come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range in spectrum from chip-level or modular components to non-modular, non-chip-level implementations and further to aggregate, distributed, or OEM devices or systems incorporating one or more aspects of the described aspects. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes and constitution.

Various aspects of the disclosure relate to beam management in multi-stream communication between a radio access network (RAN) entity and a user equipment (UE). The RAN entity may transmit a plurality of transmit beams from a plurality of transmission and reception points (TRPs) associated with the RAN entity to the UE. The UE may receive the plurality of transmit beams on a plurality of receive beams. For each of the transmit beams, the UE may obtain a beam quality metric on each of the receive beams during a measurement period to generate a respective beam quality metric vector for each of the transmit beams. The UE can then generate and transmit a beam report including the respective beam quality metric vector for each of the transmit beams to the RAN entity. In some examples, the beam report is a Layer 1 (L1) beam measurement report in which the measurements are both performed at the physical layer (L1) and reported at the physical layer (L1). The RAN entity may then select at least two beam pair links, each including a transmit beam and receive beam and each associated with a respective TRP, for spatial division multiplexing of at least two streams to the UE based on the beam report.

In some examples, for each transmit beam, the UE may measure the respective beam quality metric on each of the plurality of receive beams in parallel (e.g., at the same time) during the respective measurement period. For example, the UE may utilize a Butler matrix to perform the parallel measurements. In other examples, for each transmit beam, the UE may measure the respective beam quality metric on each of the plurality of receive beams serially (e.g., on one receive beam at a time) during the respective measurement period. Here, the serial measurements on each of the receive beams may be conducted on respective repetitions of the transmit beam, such that one measurement is obtained on each receive beam at a time using one of the repetitions of the transmit beam. In other examples, for each transmit beam, the UE may measure the respective beam quality metric on each of the plurality of receive beams in parallel for each of a plurality repetitions of the transmit beam during the respective measurement period to double the vector length.

In some examples, the beam quality metric includes a reference signal received power (RSRP). In this example, the beam quality metric vectors can include RSRP vectors. In some examples, the RSRP vectors can indicate an inter-beam interference (or mutual interference) between the plurality of transmit beams. In this example, the at least two beam pair links selected by the RAN entity may have a minimum mutual interference therebetween. In some examples, the beam report may include at least two beam quality metric vectors for each of the transmit beams. For example, the beam report may include a first beam quality metric vector for each of the transmit beams and a second beam quality metric vector for each of the transmit beams. For example, the first beam quality metric vector may include the RSRP vector the second beam quality metric vector may include a signal-to-interference-plus-noise (SINR) vector or a delay spread vector.

In some examples, the RAN entity may receive the beam report and select the at least two beam pair links during a beam refinement procedure. For example, the beam refinement procedure may be a modified P2 beam management procedure. In some examples, the UE may be a multi-antenna panel UE and each of the receive beams is associated with one of the antenna panels. In some examples, the RAN entity and UE may be communicating in a mmWave frequency band, such as FR2, FR4, FR4-a, FR4-1, FR5 or other frequency band utilizing spatially directional beams.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, 106, 142, and 146, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element or entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology.

In FIG. 1, three base stations 110, 112, and 114 are shown in cells 102, 104, and 106, respectively; and a fourth base station 116 is shown controlling remote radio heads (RRHs) 144 and 148 in cells 142 and 146. That is, a base station can have an integrated antenna or can be connected to an antenna or RRH by feeder cables. In the illustrated example, the cells 102, 104, 106, 142, and 146 may be referred to as macro-cells, as the base stations 110, 112, 114, and 116 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 116, and 118 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114; UE 134 may be in communication with base station 118; UEs 138 and 140 may be in communication with base station 116 via one or more of the RRHs 144 and 148; and UE 136 may be in communication with mobile base station 120. Here, each base station 110, 112, 114, 116, 118, and 120 may be configured to provide an access point to a core network (not shown) for all the UEs in the respective cells. In another example, a mobile network node (e.g., UAV 120) may be configured to function as a UE. For example, the UAV 120 may operate within cell 102 by communicating with base station 110.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer (P2P) fashion and/or in relay configuration.

In a further aspect of the RAN 100, sidelink signals may be used between UEs without necessarily relying on scheduling or control information from a base station. For example, two or more UEs (e.g., UEs 138 and 140) may communicate with each other using peer to peer (P2P) or sidelink signals 137 without relaying that communication through a base station (e.g., base station 144). In some examples, the sidelink signals 137 include sidelink traffic and sidelink control. In some examples, the UEs 138 and 140 may each function as a scheduling entity or an initiating (e.g., transmitting) sidelink device and/or a scheduled entity or a receiving sidelink device. For example, the UEs 138 and 140 may function as scheduling entities or scheduled entities in a P2P network, a device-to-device (D2D), vehicle-to-vehicle (V2V) network, a vehicle-to-everything (V2X), a mesh network, or other suitable network.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, a UE (e.g., UE 138) may be in the coverage area of more than one cell (e.g., cells 142 and 146). In this example, each RRH 144 and 148 serving one of the cells 142 and 146 may function as a transmission and reception point (TRP) in a coordinated multi-point (CoMP) network configuration in which downlink and/or uplink signals may be transmitted between the UE 138 and each of the TRPs 144 and 148. In some examples, the TRPs 144 and 148 may be configured using a centralized RAN architecture in which base station 116 operates to coordinate transmissions and receptions between the UE 138 and TRPs 144 and 148. For example, the base station 116 and UE 138 may be configured for multi-stream communication, in which two streams of downlink data may be simultaneously transmitted to the UE 138 from each of the TRPs 144 and 148 to reduce interference, increase the data rate, and/or increase the received power. As another example, downlink signals may be transmitted from one TRP (e.g., TRP 144) and uplink signals may be received at another TRP (e.g., TRP 148).

In addition, beamformed signals may be utilized between the UE 138 and each of the TRPs 144 and 148 communicating, for example, over a mmWave carrier, such as FR2, FR4-a, FR4-1, FR4, or FR5. To facilitate beamformed multi-stream communication, the base station 116 may select a respective beam pair link (BPL) between the UE 138 and each of the TRPs 144 and 148 for spatial division multiplexing (SDM) of a respective stream on each of the BPLs. In some examples, the base station 116 may select the BPLs based on a beam report (e.g., an L1 beam measurement report) transmitted from the UE 138 to the base station 116. However, the selected BPLs may suffer from inter-beam (inter-stream) interference at the UE 138.

Therefore, in various aspects of the disclosure, the base station 116 and UE 138 may each include a respective beam manager 150 and 152 to enable BPL selection that minimizes the inter-beam (inter-stream) interference observed at the UE 138. For example, the beam manager 152 of the UE 138 may be configured to receive a plurality of transmit beams from the TRPs 144 and 148 on a plurality of receive beams of the UE 138. The beam manager 150 may then be configured to obtain multiple parallel or serial beam quality metrics on each of the receive beams for each of the transmit beams to generate a respective beam quality metric vector for each of the transmit beams. The beam manager 150 may then generate and transmit a beam report including the respective beam quality metric vector for each of the transmit beams to the base station 116. The beam manager 152 at the base station 116 may then be configured to select the BPLs (e.g., combination of one transmit beam and one receive beam) for multi-stream communication between the TRPs 144 and 148 and UE 138 that have the minimum mutual interference (e.g., minimum inter-beam interference) therebetween.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
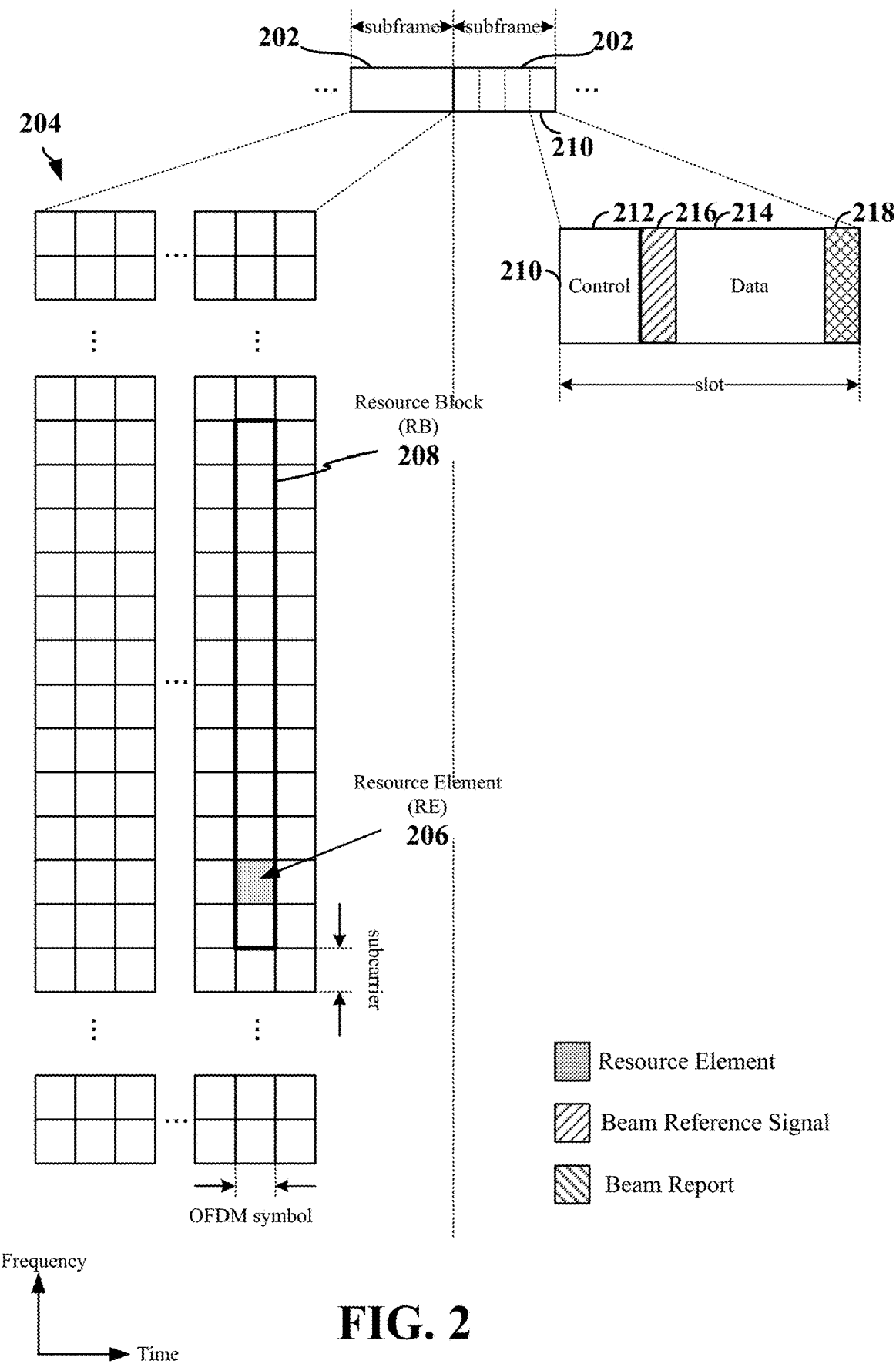
FIG. 2 is a diagram illustrating an example of a frame structure for use in a radio access network according to some aspects.

Referring now to FIG. 2, an expanded view of an exemplary DL subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

Scheduling of the resources (e.g., REs 206/RBs 208) to transmit control and/or traffic information may be performed in a dynamic manner or a semi-persistent manner. For example, the scheduling entity (e.g., base station) may dynamically allocate a set of REs 206/RBs 208 for the transmission of downlink control and/or data to the UE or for the transmission of uplink control and/or data from the UE. The base station may further semi-persistently allocate a set of REs 206/RBs 208 for periodic downlink or uplink transmissions. Generally, semi-persistent scheduling (SPS) may be used for periodic communications based on defined settings. For example, SPS may be suitable for applications with small, predictable, and/or periodic payloads, such as voice over Internet protocol (VoIP) applications. On the uplink, an SPS resource may be referred to as a configured grant (CG). With CGs, scheduling information corresponding to the uplink CG may be signaled just once to the UE. Subsequently, without needing to receive additional scheduling information, the UE may periodically utilize the resources allocated in the uplink CG. The periodicity with which the UE may transmit user data traffic via the semi-persistently scheduled resources may be established when the CG is initially configured.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. In the example shown in FIG. 2, the control region 212 may include downlink control information and the data region 214 may include downlink data channels or uplink data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

For beamforming, one or more beam reference signals 216 (e.g., SSBs and/or CSI-RSs) may be utilized with beam sweeping for beam selection and beam refinement. For example, a base station may beam sweep a set of SSBs forming a SSB burst (e.g., a set of SSBs transmitted in a 5 ms window) for wide beam selection. Each SSB may be transmitted in four symbols across 240 subcarriers in a slot. As another example, a base station may beam sweep a set of CSI-RSs for narrow beam refinement. Depending on the configured number of ports at the base station, a CSI-RS resource may start at any symbol of a slot and may occupy, for example, one, two or four symbols. In some examples, the narrow CSI-RS beams may be sub-beams of a previously selected wider SSB beam. A UE may measure a beam quality metric (e.g., reference signal received power (RSRP) or signal-to-interference-plus-noise (SINR) of each of the SSB or CSI-RS beams and transmit a beam report 218 (e.g., an L1 beam measurement report) to the base station including the measured beam quality metric of one or more of the SSB or CSI-RS beams.

In an UL transmission, the scheduled entity (e.g., UE) may utilize one or more REs 206 (e.g., within the control region 212, which may be at the end of the slot 210) to carry UL control information (UCI) including one or more UL control channels, such as a physical uplink control channel (PUCCH), to the scheduling entity. UCI may include a variety of packet types and categories. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI. The scheduled entity (e.g., UE) may further utilize one or more REs 206 (e.g., within the control region 212 and/or the data region 214) to transmit pilots, reference signals, and other information configured to enable or assist in decoding uplink data transmissions and/or in uplink beam management, such as one or more DMRSs and sounding reference signals (SRSs).

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB and/or a sidelink CSI-RS, may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1 and 2 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In some examples, spatial division multiplexing may be implemented using a coordinated multi-point (CoMP) network configuration in which transmissions (streams) from multiple transmission and reception points (TRPs) may be simultaneously directed towards a single UE. In a multi-TRP environment providing multi-stream transmission, the multiple TRPs may or may not be collocated. Each of the multiple TRPs may transmit the same or different data to a UE. When transmitting different data from the multiple TRPs, a higher throughput may be achieved. When transmitting the same data (with potentially different redundancy versions) from the multiple TRPs, transmission reliability may be improved. In some examples, each TRP may utilize the same carrier frequency to communicate with a UE. In other examples, each TRP may utilize a different carrier frequency that may be in the same or different frequency bands (e.g., FR2, FR4-a, FR4-1, FR4, FR5, etc.). For example, each TRP may communicate on different carrier frequencies (referred to as component carriers) in the same frequency band or across frequency bands and carrier aggregation may be performed at the UE.

Figure 3:
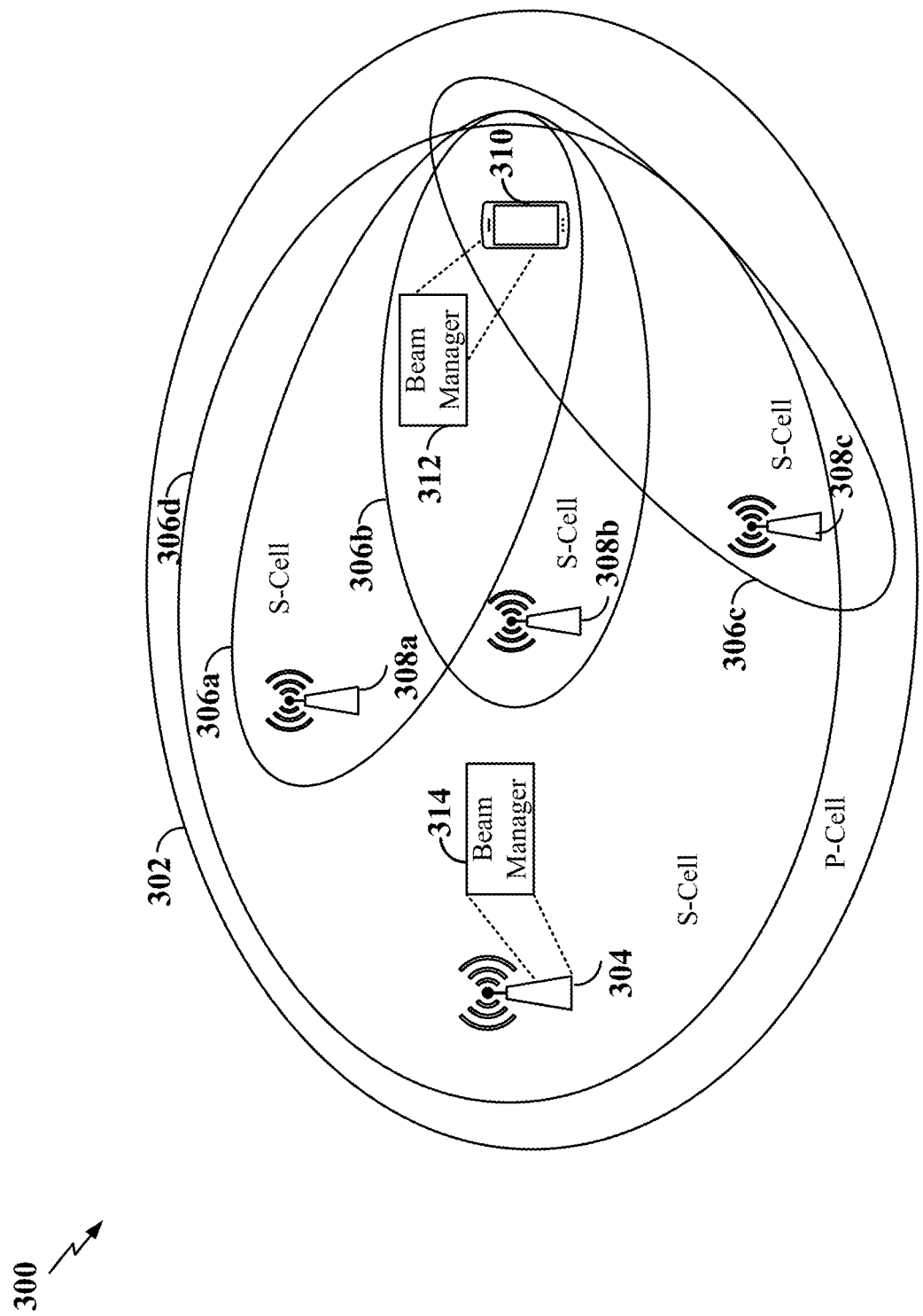
FIG. 3 is a conceptual diagram illustrating an example of a multi-TRP environment according to some aspects.

FIG. 3 is a conceptual diagram illustrating an example of a multi-TRP environment 300 according to some aspects. The multi-TRP environment 300 includes a plurality of cells 302 and 306a-306d. In some examples, one of the cells 302 may be considered a primary serving cell (PCell) 302 and the remaining cells 306a, 306b, 306c, and 306d may be considered secondary serving cells (SCells). The PCell 302 may be referred to as the anchor cell that provides a radio resource control (RRC) connection to the UE. In some examples, the PCell and the SCell may be co-located (e.g., different TRPs at the same location).

When carrier aggregation is configured, one or more of the SCells 306a-306d may be activated or added to the PCell 302 to form the serving cells serving a user equipment (UE) 310. Each serving cell corresponds to a component carrier (CC). The CC of the PCell 302 may be referred to as a primary CC, and the CC of a SCell 306a-306d may be referred to as a secondary CC. The PCell 302 and one or more of the SCells 306 may be served by a respective TRP 304 and 308a-308c similar to any of those illustrated in FIG. 1. Each TRP 304 and 308a-308c may correspond to a base station or two or more of the TRPs 304 and 308a-308c may be associated with a single base station (e.g., RRHs of a base station). In the example shown in FIG. 3, SCells 306a-306c are each served by a respective non-collocated TRP 308a-308c. However, SCell 306d is collocated with the PCell 302. Thus, TRP 304 may include two collocated TRPs, each supporting a different carrier. For example, TRP 304 may correspond to a base station including multiple collocated TRPs. The coverage of the PCell 302 and SCell 306d may differ since different component carriers (which may be in different frequency bands) may experience different path loss.

In some examples, the PCell 302 may add or remove one or more of the SCells 306a-306d to improve reliability of the connection to the UE 310 and/or increase the data rate by transmitting multiple data streams to the UE 310. In such a multi-stream communication connection, beamforming may be utilized for spatial division multiplexing (SDM) of the different streams to the UE 310. To facilitate beamformed multi-stream communication, the PCell 302 (or another centralized radio access network (RAN) entity coordinating communication among the TRPs) may select a respective beam pair link (BPL) between the UE 310 and each of the TRPs 304 and 308a-308c. Here, a separate BPL may be selected for each cell 302 and 306d associated with collocated TRPs represented by TRP 304. In some examples, the UE 310 and the PCell 302 may each include a respective beam manager 312 and 314, each configured to enable selection of BPLs that minimizes the inter-beam (inter-stream) interference observed at the UE 310.

For example, the beam manager 312 of the UE 310 may be configured to receive a plurality of transmit beams from the cells 302 and 306a-306d on a plurality of receive beams of the UE 310. In some examples, each of the received transmit beams may correspond to an active (or currently serving) beam (e.g., an SSB or CSI-RS beam) of one of the cells. In other examples, the UE 310 may receive multiple transmit beams from each cell in a respective beam sweep from each cell. The transmit beams may be SSB beams received in an SSB burst of a wide range beam sweep for beam selection or CSI-RS beams in a narrow range beam sweep for beam refinement. Here, the SSB beams may have a wider beam width than the CSI-RS beams, and thus the beam-swept CSI-RS beams may be sub-beams of a previously selected SSB beam.

The beam manager 312 may then be configured to obtain multiple parallel or serial beam quality metrics on each of the receive beams for each of the transmit beams to generate a respective beam quality metric vector for each of the transmit beams. The beam manager 312 may then generate and transmit a beam report including the respective beam quality metric vector for each of the transmit beams to the PCell 302. The beam manager 314 at the PCell 302 may then be configured to select the BPLs (e.g., each including one transmit beam from one of the cells and one receive beam on the UE 310) for multi-stream communication between the TRPs and UE that have the minimum mutual interference (e.g., minimum inter-beam interference) therebetween. In some examples, the PCell 302 may select a respective BPL associated with each of two or more of the cells (e.g., PCell 302 and SCell 304a) based on the number of streams and the mutual interference between the measured transmit beams on each of the cells.

Figure 4:
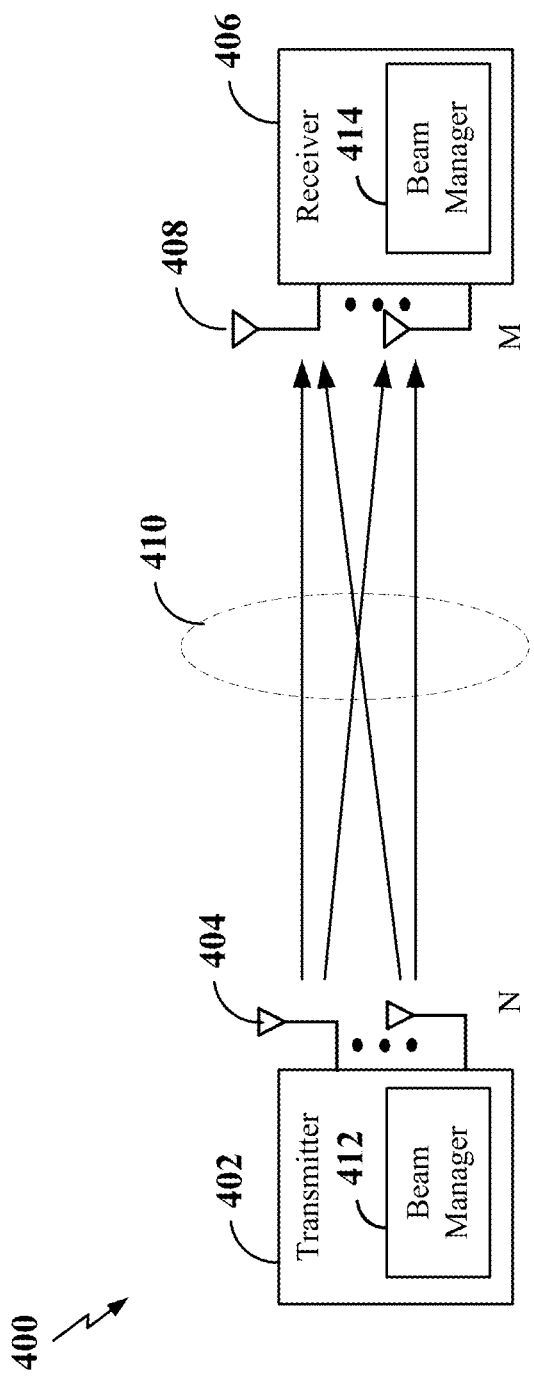
FIG. 4 is a block diagram illustrating a wireless communication system supporting beamforming and/or multiple-input multiple-output (MIMO) communication according to some aspects.

FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for mmWave systems, beamformed signals may be utilized for most downlink channels, including the physical downlink control channel (PDCCH) and physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

To facilitate multi-stream communication using SDM, the transmitter 402 and receiver 406 may include a respective beam manager 412 and 414 configured to enable selection of BPLs between the receiver 406 and the transmitter 402 and between the receiver 406 and at least one additional transmitter (not shown). Here, the receiver 406 may correspond to a UE or other scheduled entity and the transmitter 402 may correspond to a base station or other scheduling entity coordinating communication among multiple TRPs. For example, the beam manager 414 of the receiver 406 may be configured to receive a plurality of transmit beams from a plurality of TRPs, including the transmitter 402, on a plurality of receive beams of the receiver 406. The beam manager 414 may then be configured to obtain multiple parallel or serial beam quality metrics on each of the receive beams for each of the transmit beams to generate a respective beam quality metric vector for each of the transmit beams. The beam manager 414 may then generate and transmit a beam report including the respective beam quality metric vector for each of the transmit beams to the transmitter 402. The beam manager 412 at the transmitter 402 may then be configured to select the BPLs (e.g., each including one transmit beam from one of the TRPs and one receive beam on the receiver 406) for multi-stream communication between the TRPs and receiver 406 that have the minimum mutual interference (e.g., minimum inter-beam interference) therebetween.

Figure 5A:
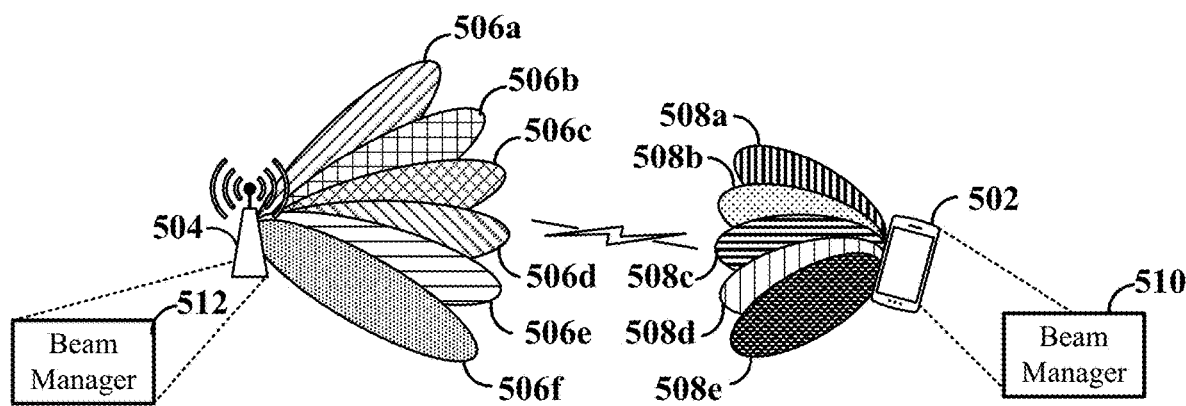
FIGS. 5A-5C are diagrams illustrating examples of beam management procedures according to some aspects.
Figure 5B:
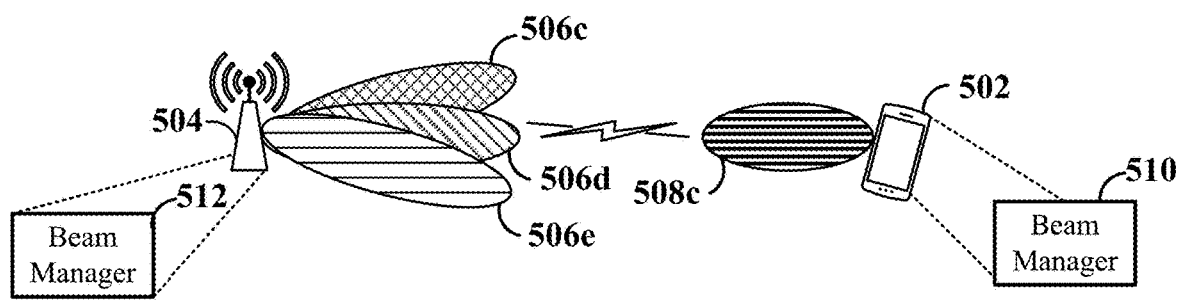
Figure 5C:
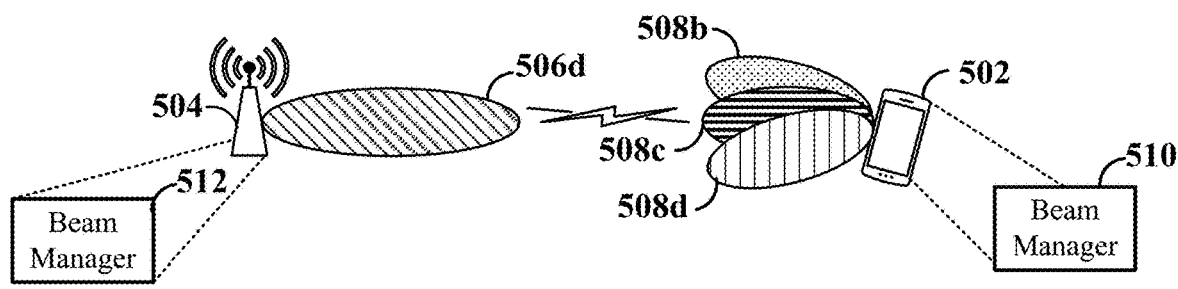

FIGS. 5A-5C are diagrams illustrating examples of beam management procedures between a base station 504 and a UE 502 according to some aspects. The base station 504 may be any of the base stations (e.g., gNBs) or scheduling entities illustrated in FIGS. 1 and/or 3, and the UE 502 may be any of the UEs or scheduled entities illustrated in FIGS. 1 and/or 3.

The base station 504 may generally be capable of communicating with the UE 502 using one or more transmit beams, and the UE 502 may further be capable of communicating with the base station 504 using one or more receive beams. As used herein, the term transmit beam refers to a beam on the base station 504 that may be utilized for downlink or uplink communication with the UE 502. In addition, the term receive beam refers to a beam on the UE 502 that may be utilized for downlink or uplink communication with the base station 504.

In the example shown in FIG. 5A, the base station 504 is configured to generate a plurality of transmit beams 506a-506f, each associated with a different spatial direction. In addition, the UE 502 is configured to generate a plurality of receive beams 508a-508e, each associated with a different spatial direction. In some examples, the transmit beams 506a-506h on the base station 504 and the receive beams 508a-508e on the UE 502 may be spatially directional mmWave beams, such as FR2, FR4-a, FR4-1, FR4, or FR5 beams. It should be noted that while some beams are illustrated as adjacent to one another, such an arrangement may be different in different aspects. For example, transmit beams 506a-506f transmitted during a same symbol may not be adjacent to one another. In some examples, the base station 504 and UE 502 may each transmit more or less beams distributed in all directions (e.g., 360 degrees) and in three-dimensions. In addition, the transmit beams 506a-506f may include beams of varying beam width. For example, the base station 504 may transmit certain signals (e.g., SSBs) on wider beams and other signals (e.g., CSI-RSs) on narrower beams.

The base station 504 and UE 502 may select one or more transmit beams 506a-506f on the base station 504 and one or more receive beams 508a-508e on the UE 502 for communication of uplink and downlink signals therebetween using a beam management procedure. In one example, as shown in FIG. 5A, during initial cell acquisition, the UE 502 may perform a P1 beam management procedure to scan the plurality of transmit beams 506a-506f transmitted in a wide range beam sweep on the plurality of receive beams 508a-508e to select a beam pair link (e.g., one of the transmit beams 506a-506f and one of the receive beams 508a-508e) for a physical random access channel (PRACH) procedure for initial access to the cell. For example, periodic SSB beam sweeping may be implemented on the base station 504 at certain intervals (e.g., based on the SSB periodicity). Thus, the base station 504 may be configured to sweep or transmit an SSB on each of a plurality of wider transmit beams 506a-506f. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam. The selected transmit beam and receive beam form a beam pair link (BPL) for the PRACH procedure. Here, the selected transmit beam may be associated with a particular RACH occasion that may be utilized by the UE 502 to transmit a PRACH preamble. In this way, the base station 504 is informed of the selected transmit beam.

After completing the PRACH procedure, as shown in FIG. 5B, the base station 504 and UE 502 may perform a P2 beam management procedure for beam refinement. For example, the base station 504 may be configured to sweep or transmit a CSI-RS on each of a plurality of transmit beams 506c-506e in a narrow range beam sweep that includes a sub-set of the transmit beams 506a-506f for beam refinement. For example, each of the CSI-RS beams may have a narrower beam width than the SSB beams, and thus the transmit beams 506c-506e transmitted during the P2 procedure may each be a sub-beam of an SSB transmit beam selected during the P1 procedure (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 502 is configured to scan the plurality of CSI-RS transmit beams 506c-506e on one or more of the plurality of receive beams. In the example shown in FIG. 5B, the UE 502 scans the CSI-RS transmit beams 506c-506e on a single receive beam 508c selected during the P1 procedure. The UE 502 then performs beam measurements (e.g., RSRP, SINR, etc.) of the transmit beams 506c-506e on the receive beam 508c to determine the respective beam quality of each of the transmit beams 506c-506e.

The UE 502 can then generate and transmit a Layer 1 (L1) measurement report (e.g., L1-RSRP or L1-SINR report), including the respective beam index (e.g., CSI-RS resource indicator (CRI)) and beam measurement (e.g., RSRP) of one or more of the CSI-RS transmit beams 506c-506e to the base station 504. The base station 504 may then select one or more CSI-RS transmit beams on which to communicate with the UE 502. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 502 may further refine the receive beam for each selected serving CSI-RS transmit beam to form a respective refined BPL for each selected serving CSI-RS transmit beam. For example, as shown in FIG. 5C, the UE 502 may perform a P3 beam management procedure to refine the UE-beam of a BPL. In an example, the base station 504 may repeat transmission of a selected transmit beam 506d selected during the P2 procedure to the UE 502. The UE 502 can scan the transmit beam 506d using different receive beams 508b-508d to obtain new beam measurements for the selected CSI-RS transmit beam 506d and select the best receive beam to refine the BPL for transmit beam 506d. In some examples, the selected receive beam to pair with a particular CSI-RS transmit beam 506*d* may be the receive beam on which the highest RSRP for the particular CSI-RS transmit beam is measured.

In some examples, in addition to configuring the UE 502 to perform P2 beam refinement (e.g., CSI-RS beam measurements), the base station 504 may configure the UE 502 to perform a P1 beam management procedure (e.g., SSB beam measurements) outside of a RACH procedure and to provide an L1 measurement report containing beam measurements of one or more SSB transmit beams 506*a*-506*h* as measured on one or more of the receive beams 508*a*-508*e*. In this example, the L1 measurement report may include multiple RSRPs for each transmit beam, with each RSRP corresponding to a particular receive beam to facilitate selection of BPL(s). For example, the base station 504 may configure the UE 502 to perform SSB beam measurements and/or CSI-RS beam measurements for various purposes, such as beam failure detection (BRD), beam failure recovery (BFR), cell reselection, beam tracking (e.g., for a mobile UE 502 and/or base station 504), or other beam optimization purpose.

In addition, when the channel is reciprocal, the transmit and receive beams may be selected using an uplink beam management scheme. In an example, the UE 502 may be configured to sweep or transmit on each of a plurality of receive beams 508*a*-508*e*. For example, the UE 502 may transmit an SRS on each beam in the different beam directions. In addition, the base station 504 may be configured to receive the uplink beam reference signals on a plurality of transmit beams 506*a*-506*f*. The base station 504 then performs beam measurements (e.g., RSRP, SINR, etc.) of the beam reference signals on each of the transmit beams 506*a*-506*f* to determine the respective beam quality of each of the receive beams 508*a*-508*e* as measured on each of the transmit beams 506*a*-506*f*.

The base station 504 may then select one or more transmit beams on which to communicate with the UE 502. In some examples, the selected transmit beam(s) have the highest RSRP. The UE 502 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 506*d*) on the base station 504 and a single receive beam (e.g., beam 508*c*) on the UE may form a single BPL used for communication between the base station 504 and the UE 502. In another example, multiple CSI-RS transmit beams (e.g., beams 506*c*, 506*d*, and 506*e*) on the base station 504 and a single receive beam (e.g., beam 508*c*) on the UE 502 may form respective BPLs used for communication between the base station 504 and the UE 502. In another example, multiple CSI-RS transmit beams (e.g., beams 506*c*, 506*d*, and 506*e*) on the base station 504 and multiple receive beams (e.g., beams 508*c* and 508*d*) on the UE 502 may form multiple BPLs used for communication between the base station 504 and the UE 502. In this example, a first BPL may include transmit beam 506*c* and receive beam 508*c*, a second BPL may include transmit beam 508*d* and receive beam 508*c*, and a third BPL may include transmit beam 508*e* and receive beam 508*d*.

In some examples, the different BPLs may be associated with different TRPs of the base station 504 to enable SDM of multiple streams to the UE 502. In this example, the TRPs may be collocated (e.g., on the same tower) or non-collocated (e.g., spaced apart remote radio heads of the base station). To facilitate multi-stream communication using SDM, the UE 502 and the base station 504 may include a respective beam manager 510 and 512 configured to enable selection of BPLs between the UE 502 and two or more TRPs associated with the base station 504. For example, the beam manager 510 of the UE 502 may be configured to receive a plurality of transmit beams from a plurality of TRPs of the base station 504, on a plurality of receive beams of the UE 502. The beam manager 510 may then be configured to obtain multiple parallel or serial beam quality metrics on each of the receive beams for each of the transmit beams to generate a respective beam quality metric vector for each of the transmit beams. The beam manager 510 may then generate and transmit a beam report including the respective beam quality metric vector for each of the transmit beams to the base station 504. The beam manager 512 at the base station 504 may then be configured to select the BPLs (e.g., each including one transmit beam from one of the TRPs and one receive beam) for multi-stream communication between the TRPs and UE 502 that have the minimum mutual interference (e.g., minimum inter-beam interference) therebetween.

Figure 6:
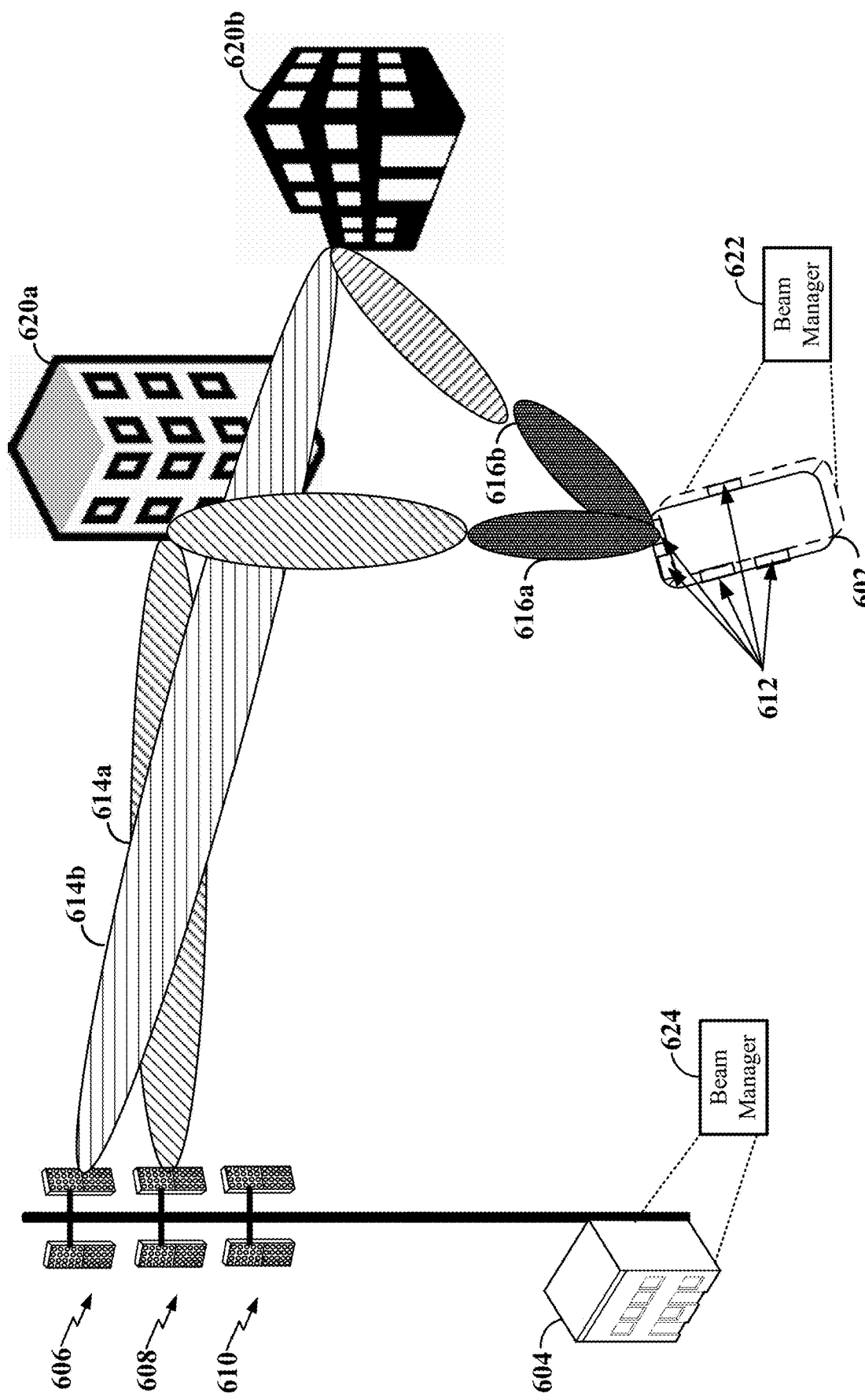
FIG. 6 is a diagram illustrating an example of multi-stream communication according to some aspects.

FIG. 6 is a diagram illustrating an example of multi-stream communication between a UE 602 and a radio access network (RAN) entity 604 according to some aspects. The RAN entity 604 may be any of the base stations (e.g., gNBs) or scheduling entities illustrated in FIGS. 1, 3 and/or 5, and the UE 602 may be any of the UEs or scheduled entities illustrated in FIGS. 1, 3 and/or 5. The RAN entity 604 may be configured to coordinate communication amongst a plurality of TRPs 606, 608, and 610. The TRPs 606, 608, and 610, may be collocated, as shown in FIG. 6, or non-collocated.

The UE 602 may include a single antenna panel 612 or multiple antenna panels, the latter being illustrated in FIG. 6. For example, the antenna panels 612 may be located at various positions on the UE 602 to enable each antenna panel 612 to cover a respective portion of a sphere surrounding the UE 602. Each antenna panel 612 may support a plurality of beams (e.g., receive beams). For mmWave (e.g., FR2 or higher) communication, multiple concurrent beams may be supported by the same antenna panel 612 using, for example, a Butler matrix. For example, the UE 602 may include P antenna panels, each supporting up to B beams. A number of active antenna panels K, where K≤P, can be used at the same time to receive multiple streams S, where S≤K*B. Here, the K*B beams may be referred to as a beam collection (e.g., a collection of beams). The UE 602 may process each beam in the beam collection independently, up to the log likelihood ratio (LLR) level.

The RAN entity 604, acting as a multi-TRP (m-TRP), can be configured to provide S independent streams on S separate beams. In the example shown in FIG. 6, the RAN entity 604 may provide a first stream on a first transmit beam 614*a* from TRP 608 and a second stream on a second transmit beam 614*b* from TRP 606. Each transmit beam 614*a* and 614*b* may be directed (e.g., via a line-of-sight path or reflection off of one or more objects 620*a* and 620*b*) towards the UE 602 and received via a respective receive beam 616*a* and 616*b* on the UE 602. Thus, each transmit beam 614*a* and 614*b* and corresponding receive beam 616*a* and 616*b* form a respective BPL between the RAN entity 604 and the UE 602. The receive beams 616*a* and 616*b* may correspond to the same antenna panel 612, as shown in FIG. 6, or different antenna panels. Using the same antenna panel may reduce power consumption at the UE, as only a single antenna panel is turned on.

In some examples, the RAN entity 604 may select the transmit beams 614a and 614b (e.g., downlink serving beams) based on an L1-RSRP report or L1-SINR report (e.g., SSB resource indicator (SRI) or CSI-RS resource indicator (CRI) based beam report). However, relying on RSRP or SINR alone may result in inter-beam interference between SDM streams on each of the BPLs.

Therefore, in various aspects of the disclosure, beam reports (e.g., L1-RSRP or L1-SINR reports) may be enhanced to include information indicating the mutual interference between beams, as observed at the UE 602. For example, each of the UE 602 and the RAN entity 604 may include a respective beam manager 622 and 624 configured to enable selection of BPLs between the UE 602 and TRPs 606, 608, and 610 associated with the RAN entity 604. For example, the beam manager 622 of the UE 602 may be configured to obtain multiple parallel or serial beam quality metrics on each of the receive beams (e.g., of each of the panels 612) for each of the transmit beams to generate a respective beam quality metric vector for each of the transmit beams. The beam manager 622 may then generate and transmit a beam report including the respective beam quality metric vector for each of the transmit beams to the RAN entity 604. The beam manager 624 at the RAN entity 604 may then be configured to select the BPLs (e.g., each including one transmit beam from one of the TRPs and one receive beam on one of the UE panels) for multi-stream communication between the TRPs and UE 602 that have the minimum mutual interference (e.g., minimum inter-beam interference) therebetween.

Figure 7:
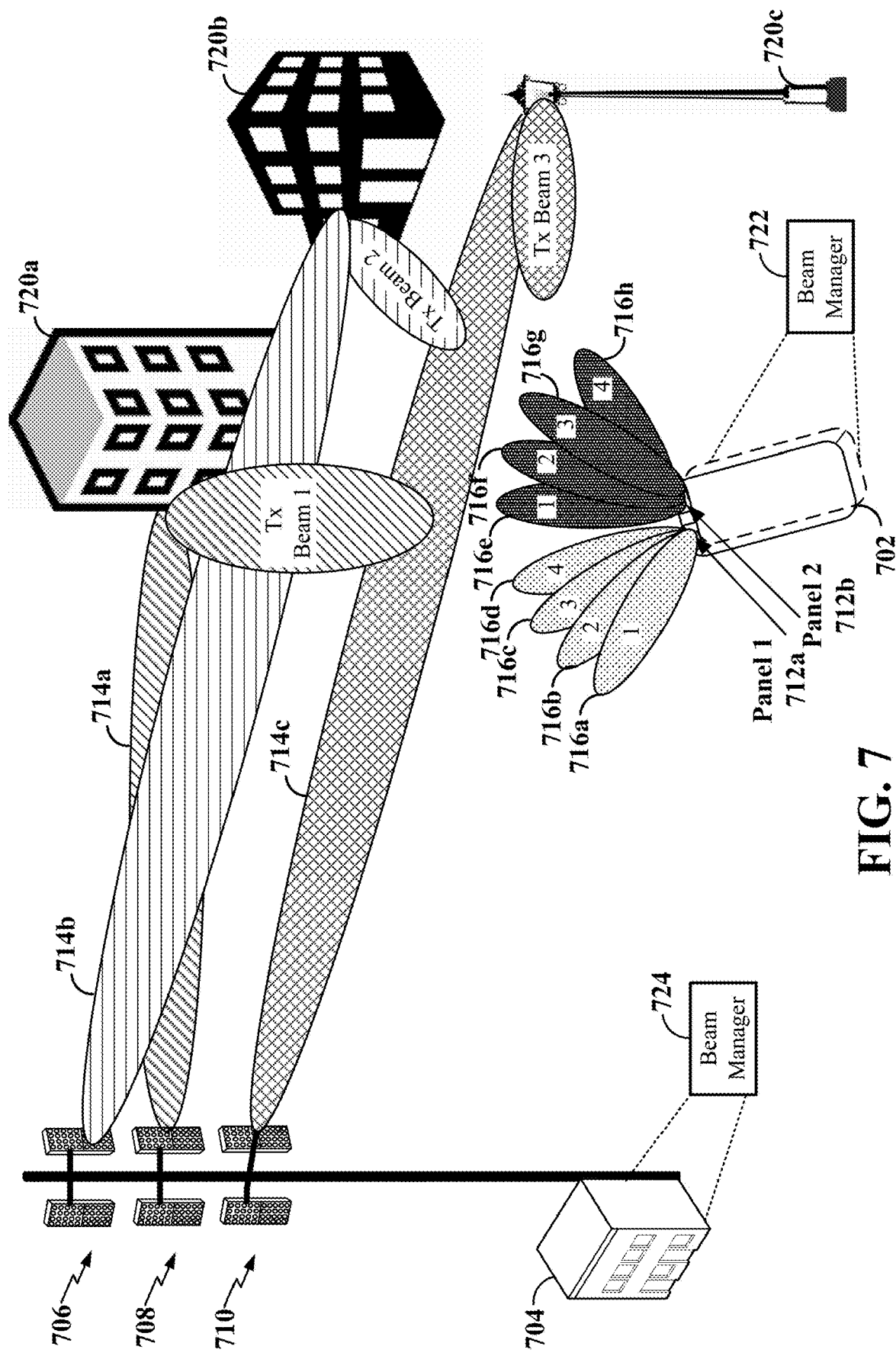
FIG. 7 is a diagram illustrating an example of a beam management procedure for multi-stream communication according to some aspects.

FIG. 7 is a diagram illustrating an example of a beam management procedure between a UE 702 and a RAN entity 704 for multi-stream communication according to some aspects. The RAN entity 704 may be any of the base stations (e.g., gNBs) or scheduling entities illustrated in FIGS. 1, 3, 5 and/or 6, and the UE 702 may be any of the UEs or scheduled entities illustrated in FIGS. 1, 3, 5 and/or 6.

The RAN entity 704 may be configured to coordinate communication amongst a plurality of TRPs 706, 708, and 710 for SDM of multiple streams to the UE 702. The TRPs 706, 708, and 710, may be collocated, as shown in FIG. 7, or non-collocated. Each of the TRPs 706, 708, and 710 may support a plurality of transmit beams 714a, 714b, and 714c, one of which on each TRP 706, 708, and 710 is shown for convenience. Each transmit beam 714a, 714b, and 714c may be utilized to transmit a respective stream to the UE 702 (e.g., via respective line-of-sight paths or reflection from one or more objects 720a, 720b, and 720c, the latter being illustrated in FIG. 7).

The UE 702 may include a plurality of antenna panels 712a and 712b, two of which are shown for convenience. The antenna panels 712a and 712b may support a plurality of beams (e.g., receive beams) 716a-716h. For example, antenna panel 712a may support receive beams 716a-716d and antenna panel 712b may support receive beams 716e-716h. The set of all receive beams 716a-716h on active panels (e.g., panels 712a and 712b) on the UE 702 may be referred to as a collection of beams (e.g., a beam collection). In various aspects of the disclosure, all receive beams in the beam collection may be operated simultaneously by the UE 702.

The UE 702 and the RAN entity 704 may each include a respective beam manager 722 and 724 configured to facilitate the beam management procedure. In some examples, the beam management procedure may include a P2 beam refinement procedure or other beam management procedure in which a beam report (e.g., an L1-RSRP report) is sent from the UE 702 to the RAN entity 704. During the beam management procedure, the beam manager 724 on the RAN entity 704 may generate and transmit a plurality of transmit beams 714a, 714b, and 714c (e.g., SSB beams or CSI-RS beams) from the TRPs 706, 708, and 710 within a frequency band (e.g., FR2, FR4-a, FR4-1, FR4, FR5 or other mmWave or higher frequency band). For example, the beam manager 724 may generate and transmit a respective beam reference signal (e.g., SSB or CSI-RS) on each of the transmit beams 714a, 714b, and 714c. The transmit beams 714a, 714b, and 714c include at least one transmit beam from each TRP 706, 708, and 710, as shown in FIG. 7. In some examples, the transmit beams 714a, 714b, and 714c include active beams (e.g., current downlink serving beams for the UE 702) on the TRPs 706, 708, and 710. In other examples, the transmit beams 714a, 714b, and 714c include sub-beams (e.g., CSI-RS beams) of selected SSB beams on each of the TRPs 706, 708, and 710 or SSB beams on each of the TRPs transmitted in a beam sweep across the TRPs 706, 708, and 710.

For each transmit beam 714a, 714b, and 714c transmitted during the beam management procedure, the beam manager 722 on the UE 702 may obtain a beam quality metric on each of the receive beams 716a-716h in the beam collection in parallel (e.g., using a Butler matrix) or serially during a measurement period to generate a beam quality metric vector for each transmit beam 714a, 714b, and 714c. Examples of beam quality metrics include, but are not limited to, RSRP, SINR, or delay spread. For example, the beam manager 722 may measure the RSRP of a transmit beam (e.g., transmit beam 714a) on each of the receive beams 716a-716h and generate an RSRP vector of the measure RSRP values of the transmit beam 714a on each of the receive beams 716a-716h. The beam manager 724 may then repeat the parallel or serial RSRP measurements of each of the other transmit beams 714b and 714c to generate respective RSRP vectors for transmit beams 714b and 714c. The beam manager 722 may obtain the RSRP vectors by measuring the RSRP of the beam reference signal (e.g., SSB or CSI-RS) transmitted on the transmit beams 714a, 714b, and 714c. In some examples, the beam manager 722 on the UE 702 may obtain a respective RSRP vector for each of the transmit beams 714a, 714b, and 714c, and may further obtain one or more other beam quality metric vectors (e.g., SINR vectors and/or delay spread vectors) for each of the transmit beams 714a, 714b, and 714c during the beam management procedure.

The beam manager 722 on the UE 702 may then generate a beam report including the respective beam quality metric vector(s) for each of the transmit beams 714a, 714b, and 714c and transmit the beam report to the RAN entity 704. At the RAN entity 704, the beam manager 724 may be configured to process the beam report to identify the optimal matching between transmit beams 714a, 714b, and 714c and corresponding receive beams 716a-716h for forming BPLs. For example, the beam manager 724 may select at least two BPLs, each including a respective one of the transmit beams 714a, 714b, and 714c and a respective one of the receive beams 716a-716h. Each of the selected BPLs may be utilized for SDM of multiple streams to the UE 702.

In some examples, the beam manager 724 may select the BPLs with the strongest RSRP that also have the minimum mutual interference therebetween. Here, the strongest RSRP may include an RSRP above a threshold amount. For example, the beam manager 722 may utilize the respective RSRP vectors of each of the transmit beams 714a, 714b, and 714c to identify a set of candidate BPLs associated with each of the TRPs having the strongest RSRP values. From the set of candidate BPLs, the beam manager 724 may select the two or more BPLs with the minimum mutual interference therebetween. In some examples, the beam manager 724 may include at least one BPL associated with each of the TRPs 706, 708, and 710 in the set of candidate BPLs and select a single BPL from two or more of the TRPs for multi-stream communication with the UE 702 based on at least the mutual interference between each of the candidate BPLs. In some examples, the beam manager 724 may further utilize other beam quality metric vector(s) (e.g., SINR or delay spread vectors) associated with each of the transmit beams 714a, 714b, and 714c to select the BPLs. For example, the beam manager 724 may utilize the other beam quality metric vector(s) to select the BPLs when there are multiple candidate BPLs that provide a minimum mutual interference therebetween.

Figure 8:
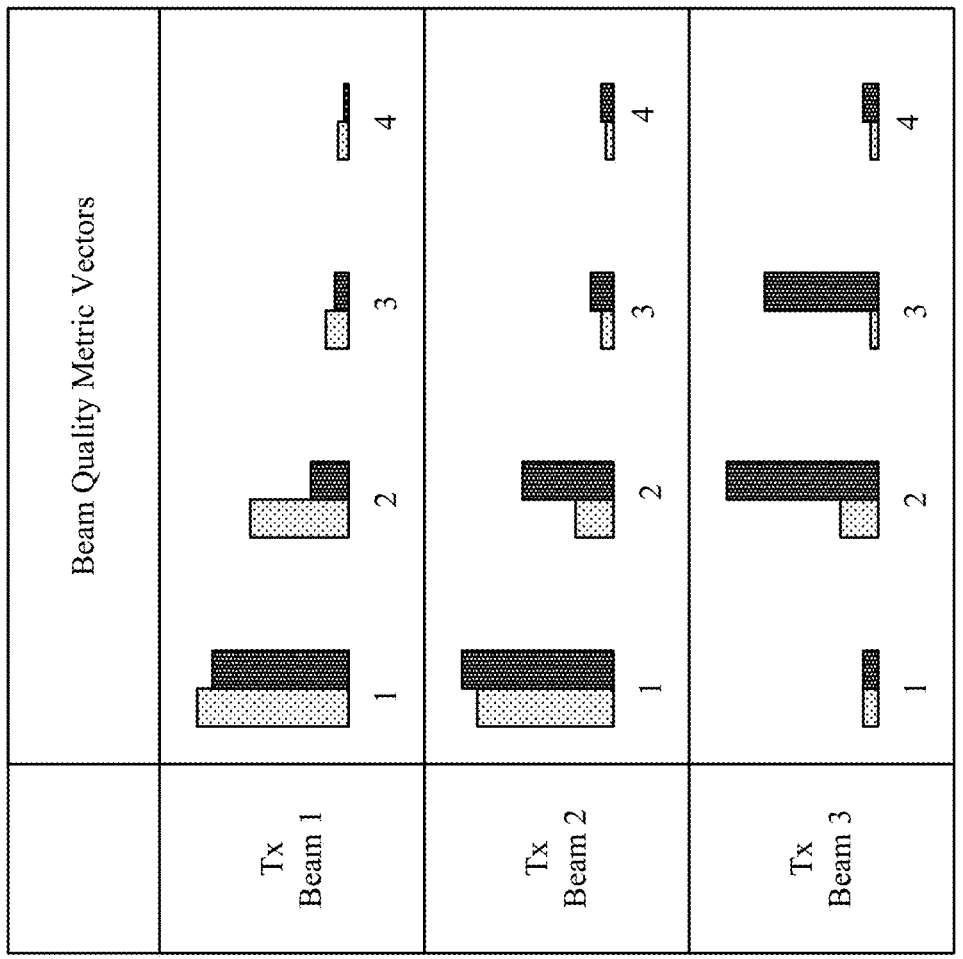
FIG. 8 is a diagram illustrating an example of beam quality metric vectors obtained during the beam management procedure of FIG. 7 according to some aspects.

FIG. 8 is a diagram illustrating an example of beam quality metric vectors 800a, 800b, and 800c obtained during the beam management procedure of FIG. 7 according to some aspects. Each beam quality metric vector 800a, 800b, and 800c may correspond, for example, to an RSRP vector. A first RSRP vector 800a includes the RSRP of transmit beam 714a (Tx beam 1) as measured in parallel or serially on each of the four receive beams 716a-716d on antenna panel 712a and as measured in parallel or serially on each of the four receive beams 716e-716h on antenna panel 712h. A second RSRP vector 800b includes the RSRP of transmit beam 714b (Tx beam 2) as measured in parallel or serially on each of the four receive beams 716a-716d on antenna panel 712a and as measured in parallel or serially on each of the four receive beams 716e-716h on antenna panel 712h. A third RSRP vector 800c includes the RSRP of transmit beam 714c (Tx beam 3) as measured in parallel or serially on each of the four receive beams 716a-716d on antenna panel 712a and as measured in parallel or serially on each of the four receive beams 716e-716h on antenna panel 712h.

As can be seen in the example of FIG. 8, candidate receive beams to form a BPL with Tx beam 1 (e.g., receive beams having the strongest RSRP of Tx beam 1) may include the first receive beam (e.g., receive beam 716a) on antenna panel 712a, the first receive beam (e.g., receive beam 716e) on antenna panel 712b, and the second receive beam (e.g., receive beam 716b) on antenna panel 712a. In addition, candidate receive beams to form a BPL with Tx beam 2 (e.g., receive beams having the strongest RSRP of Tx beam 2) may include the first receive beam (e.g., receive beam 716a) on antenna panel 712a, the first receive beam (e.g., receive beam 716e) on antenna panel 712b, and the second receive beam (e.g., receive beam 716f) on antenna panel 712b. Furthermore, candidate receive beams to form a BPL with Tx beam 3 (e.g., receive beams on which the strongest RSRP of Tx beam 3 was measured) may include the second receive beam (e.g., receive beam 716f) on antenna panel 712b and the third receive beam (e.g., receive beam 716g) on antenna panel 712b.

To minimize the mutual interference experienced by the UE 702 between BPLs, different receive beams on the same or different panels may be selected to form BPLs with respective ones of the transmit beams. For example, the RAN entity 704 may select the first receive beam (e.g., receive beam 716e) on the second antenna panel 712b to form a BPL with Tx beam 2 (e.g., transmit beam 714b) and the second receive beam (e.g., receive beam 716f) on the second antenna panel 712b to form a BPL with Tx beam 3 (e.g., transmit beam 714c). Selecting receive beams on the same antenna panel (e.g., antenna panel 712b) may reduce power consumption at the UE 702. However, the RAN entity 704 may also select BPLs on different antenna panels. For example, the RAN entity 704 may select the first receive beam (e.g., receive beam 716a) on the first antenna panel 712a to form a BPL with Tx beam 1 (e.g., transmit beam 714a) and the second receive beam (e.g., receive beam 716f) on the second antenna panel 712b to form a BPL with Tx beam 3 (e.g., transmit beam 714c). In some examples, the RAN entity 704 may utilize other beam quality metric vectors to select between the candidate receive beams and form at least two BPLs (e.g., with at least two of the transmit beams 714a, 714b, and 714c). The number of selected BPLs may correspond to the number of different data streams configured for communication between the RAN entity 704 and the UE 702.

Figure 9:
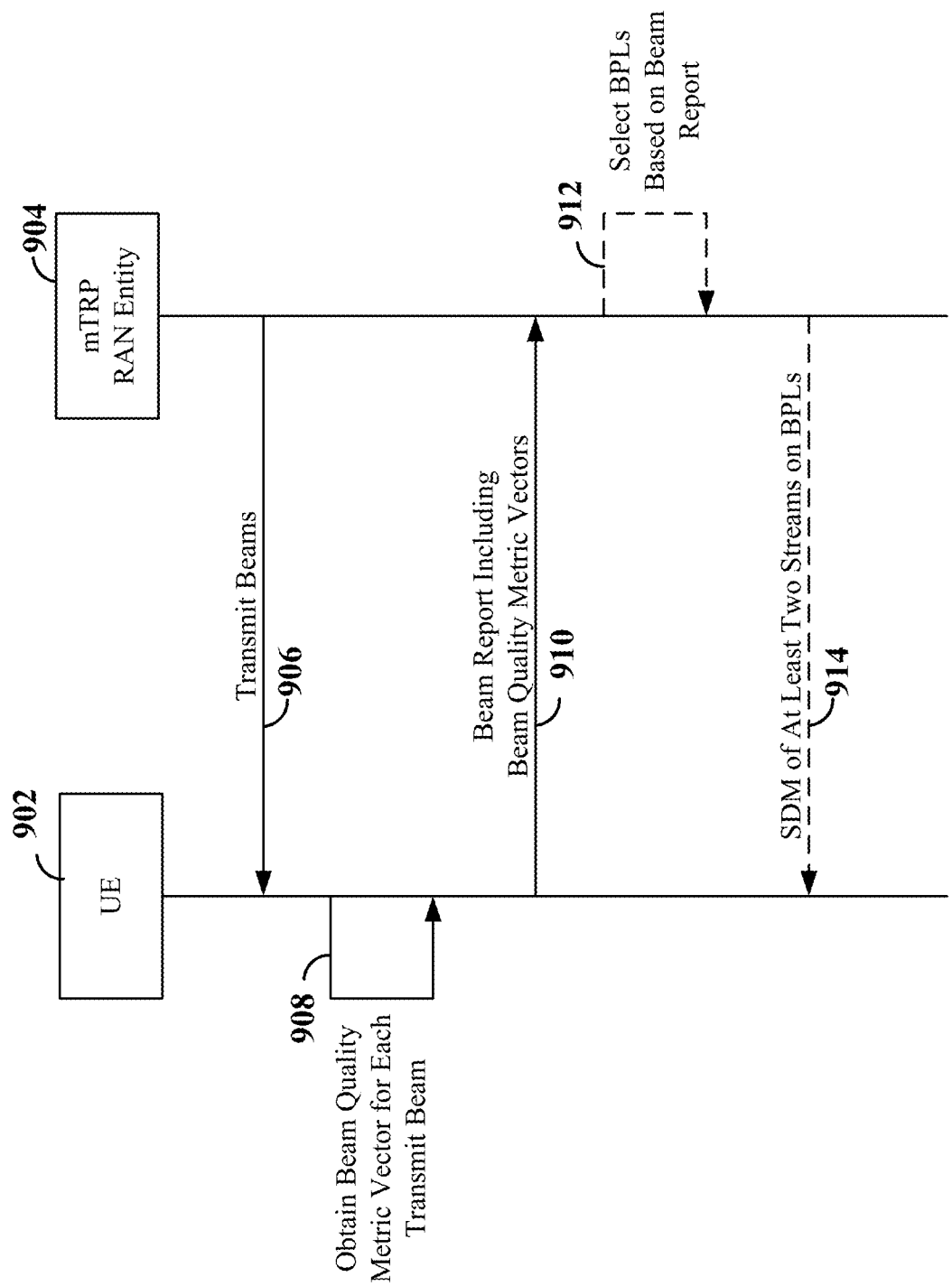
FIG. 9 is a signaling diagram illustrating an exemplary beam management procedure for multi-stream communication according to some aspects.

FIG. 9 is a signaling diagram illustrating an exemplary beam management procedure between a UE 902 and an m-TRP RAN entity 904 for multi-stream communication according to some aspects. The m-TRP RAN entity 904 may be any of the base stations (e.g., gNBs) or scheduling entities illustrated in FIGS. 1, 3, and/or 5-7, and the UE 902 may be any of the UEs or scheduled entities illustrated in FIGS. 1, 3 and/or 5-7. The m-TRP RAN entity 904 may be configured to coordinate communication amongst a plurality of TRPs (m TRPs), which may be collocated or non-collocated, for the multi-stream communication.

At 906, the m-TRP RAN entity 904 may transmit a plurality of transmit beams in a mmWave frequency band (e.g., FR2 or higher frequency band), each carrying a respective beam reference signal (e.g., SSB or CSI-RS) to the UE 902. The m-TRP RAN entity 904 may transmit the plurality of transmit beams during a beam refinement procedure or other beam management procedure in which a beam report (e.g., an L1-RSRP report) is generated. In some examples, each of the m-TRPs transmits at least one of the plurality of transmit beams. In other examples, a subset of the m-TRPs transmits the transmit beams towards the UE 902. For example, the subset of the m-TRPs may include active TRPs activated for multi-cell (multi-TRP) communication with the UE 902.

At 908, the UE 902 may obtain a beam quality metric vector for each of the transmit beams. For example, for each transmit beam, the UE 902 may measure a respective beam quality metric (e.g., RSRP, SINR, and/or delay spread) on each of a plurality of receive beams during a measurement period. The receive beams may include all receive beams on all antenna panels of the UE 902 or a subset of the receive beams or a subset of the antenna panels. The UE 902 may then place the beam quality metric values measured on each of the receive beams for each of the transmit beams in a respective beam quality metric vector for each of the transmit beams.

In some examples, for each transmit beam, the UE 902 may measure the respective beam quality metric on each of the plurality of receive beams in parallel (e.g., at the same time). For example, the UE 902 may utilize a Butler matrix to perform the parallel measurements. Here, the parallel measurements on each of the receive beams are conducted on a single transmit beam, such that the parallel measurements are performed substantially simultaneously. In this example, the measurement period may correspond to a duration of time during which the parallel measurements are performed. In some examples, for each transmit beam, the UE 902 may measure the respective beam quality metric on each of the plurality of receive beams serially (e.g., on one receive beam at a time). Here, the serial measurements on each of the receive beams are conducted on respective repetitions of the transmit beam, such that one measurement is obtained on each receive beam at a time using one of the repetitions of the transmit beam. In this example, the measurement period may correspond to a duration of time during which all of the repetitions of the transmit beam are transmitted and serially measurements are obtained of the repetitions on respective receive beams of the UE. In some examples, for each transmit beam, the UE 902 may measure the respective beam quality metric on each of the plurality of receive beams in parallel for each of a plurality repetitions of the transmit beam. In this example, the UE 902 may utilize the repetitions of the transmit beam to double the vector length. Here, the measurement period may correspond to a duration of time during which all repetitions of the transmit beam are transmitted and substantially simultaneous measurements are obtained on each of the receive beams for each of the repetitions.

At 910, the UE 902 may then generate and transmit a beam report including the obtained beam quality metric vectors for each of the transmit beams to the m-TRP RAN entity 904. In some examples, the beam report may include multiple beam quality metric vectors for each of the transmit beams, where each beam quality metric vector represents a different beam quality metric. For example, the beam report may include an RSRP vector for each of the transmit beams, along with an SINR and/or delay spread vector for each of the transmit beams.

At 912, the m-TRP RAN entity 904 may optionally select two or more BPLs based on the beam report. Each BPL may be associated with a different TRP. For example, the m-TRP RAN entity 904 may select the BPLs with the strongest RSRP that also have the minimum mutual interference therebetween. At 914, the m-TRP RAN entity 904 may optionally utilize the selected BPLs for multi-stream communication with the UE 902.

FIGS. 10A and 10B are diagrams illustrating examples of a beam report 1002 including beam quality metric vectors according to some aspects. The beam report 1002 may include, for example, an L1 measurement report. In the example shown in FIG. 10A, the L1 measurement report 1002 includes a respective beam quality metric (BQM) vector 1004 for each of a plurality of transmit beams 1006 identified by a respective CSI-RS resource indicator (CRI). For example, the L1 measurement report 1002 may include BQM Vectors 1-4, each associated with a respective CRI 1-4. Each BQM vector 1004 may include, for example, an RSRP vector, such as the RSRP vectors 800a-800c shown in FIG. 8. In the example shown in FIG. 10B, BQM vectors 1004 for multiple BQMs 1008a and 1008b are included in the L1 measurement report 1002. For example, a first BQM 1008a may be RSRP, while a second BQM 1008b may be SINR or delay spread. Each BQM 1008a and 1008b includes a respective BQM vector 1004 for each of the transmit beams 1006.

Figure 11:
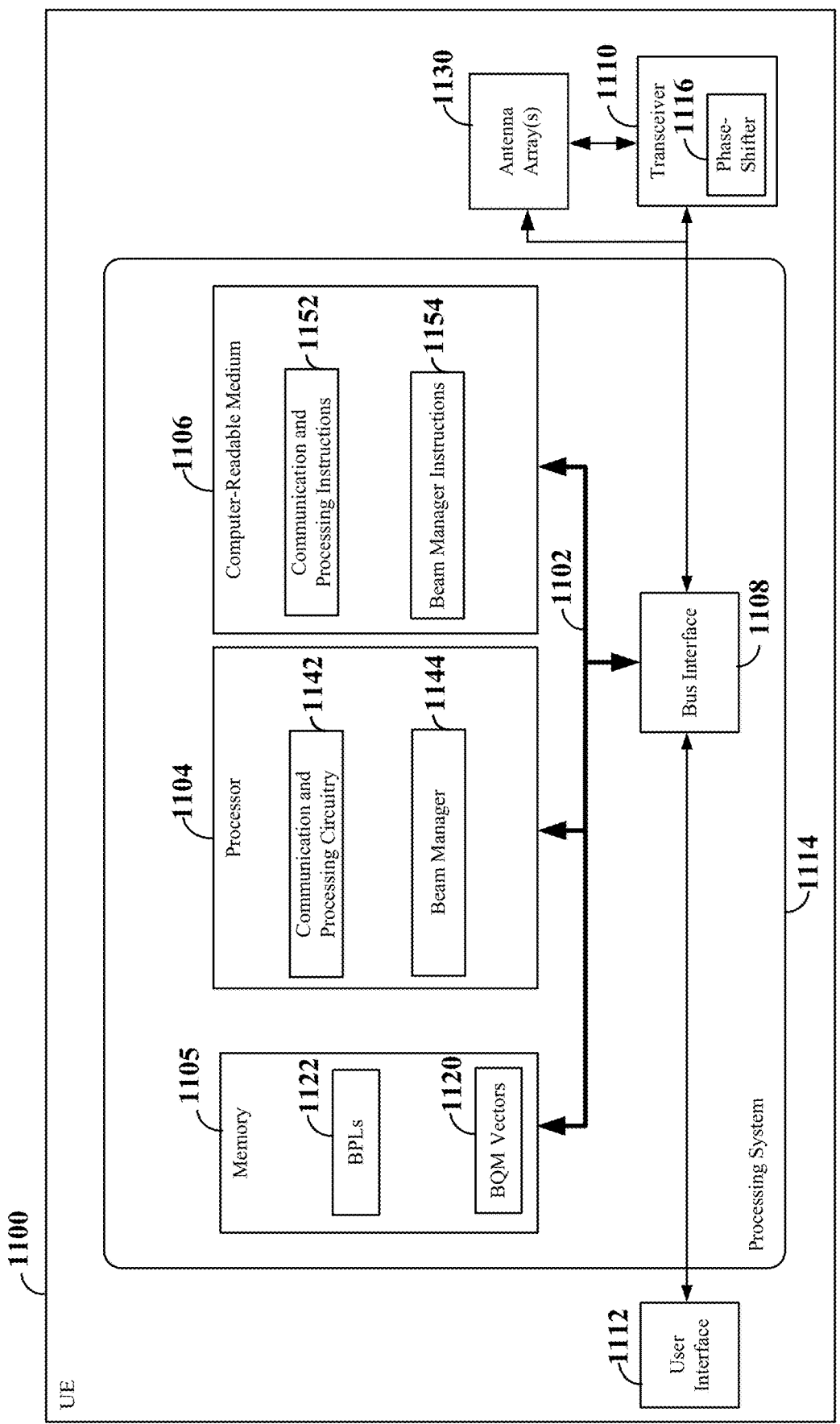
FIG. 11 is a block diagram illustrating an example of a hardware implementation for a UE employing a processing system according to some aspects.

FIG. 11 is a conceptual diagram illustrating an example of a hardware implementation for an exemplary UE 1100 employing a processing system 1114. For example, the UE 1100 may be any of the UEs or scheduled entities illustrated in any one or more of FIGS. 1, 2, 5-7, and/or 9.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes described below in connection with FIG. 11.

The processor 1104 may in some instances be implemented via a baseband or modem chip and in other implementations, the processor 1104 may itself comprise a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a means for communicating with various other apparatus over a transmission medium (e.g., air interface). In some examples, the transceiver 1110 may include a phase-shifter 1116 for digital and/or analog beamforming via one or more antenna array(s) 1130. Each antenna array 1130 may correspond, for example, to an antenna panel. Multiple antenna panels may be positioned in various locations on the UE 1100 to provide full spatial coverage and meet maximum permissible exposure requirements. A user interface 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. In some examples, the computer-readable medium 1106 may be part of the memory 1105. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with a RAN entity, such as a m-TRP base station or other scheduling entity. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1142 may be configured to receive and process downlink beamformed signals at a mmWave frequency (e.g., FR2, FR4-a, FR4-1, FR4, FR5, etc.) via the transceiver 1110 and the antenna arrays 1130 (e.g., using the phase-shifter 1116). In addition, the communication and processing circuitry 1142 may be configured to generate and transmit uplink beamformed signals at a mmWave frequency via the transceiver 1110 and antenna arrays 1130 (e.g., using the phase-shifter 1116). For example, the communication and processing circuitry 1142 may be configured for multi-stream communication with the m-TRP RAN entity via spatial division multiplexing (SDM) of the multiple streams on corresponding multiple beam pair links (BPLs) between the UE 1100 and respective TRPs.

The communication and processing circuitry 1142 may further be configured to receive a plurality of transmit beams from a plurality of TRPs of a m-TRP RAN entity on a plurality of receive beams via the antenna arrays 1130 and transceiver 1110. Each of the transmit beams may carry a respective beam reference signal (e.g., an SSB or CSI-RS). The communication and processing circuitry 1142 may further be configured to transmit a beam report (e.g., an L1 measurement report) to the m-TRP RAN entity. The communication and processing circuitry 1142 may further be configured to execute communication and processing software 1152 stored in the computer-readable medium 1106 to implement one or more of the functions described herein.

The processor 1104 may further include beam manager circuitry 1144, configured to perform beam management for SDM multi-stream communication. The beam manager circuitry 1144 may correspond, for example, to any of the UE beam managers shown in FIGS. 1 and/or 3-7. The beam manager circuitry 1144 may be configured to perform beam management for SDM multi-stream communication during a beam refinement procedure (e.g., P2 procedure) or other beam management procedure in which a beam report is generated.

For each transmit beam of the m-TRP RAN entity received by the UE 1100, the beam manager circuitry 1144 may be configured to obtain a respective beam quality metric (e.g., RSRP, SINR, delay spread, etc.) on a plurality of receive beams of the antenna array(s) 1130 in parallel or serially during a respective measurement period. For example, the beam manager circuitry 1144 may be configured to utilize a Butler matrix to obtain the beam quality metrics on each of the receive beams in parallel. The receive beams may include all receive beams on all antenna arrays 1130 (antenna panels) of the UE 1100 or a subset of the receive beams or a subset of the antenna arrays. The beam quality metrics may be obtained, for example, by performing measurements on the transmit beams utilizing respective beam reference signals (e.g., SSBs or CSI-RSs) carried on the transmit beams.

The beam manager circuitry 1144 may then be configured to generate a respective beam quality metric vector 1120 for each of the transmit beams. For example, the beam manager circuitry 1144 may place all obtained beam quality metric values for each of the transmit beams in a respective beam quality metric vector 1120. In some examples, the beam manager circuitry 1144 may be configured to generate multiple beam quality metric vectors 1120 for each transmit beam, where each beam quality metric vector 1120 corresponds to a different beam quality metric (e.g., RSRP, SINR, delay spread, etc.). For example, the beam manager circuitry 1144 may generate a first beam quality metric vector corresponding to an RSRP vector and a second beam quality metric vector corresponding to an SINR vector or a delay spread vector. In some examples, the RSRP vectors for the transmit beams indicates a mutual interference between the transmit beams as observed at the UE 1100.

The beam quality metric vectors 1120 may be stored, for example, in memory 1105 for subsequent processing. For example, the beam manager circuitry 1144 may be configured to generate a beam report (e.g., an L1 measurement report) and include each of the beam quality metric vectors 1120 in the beam report for transmission to the m-TRP RAN entity via the communication and processing circuitry 1142 and transceiver 1110. The beam manager circuitry 1144 may further be configured to receive an indication of two or more selected BPLs 1122 selected by the m-TRP RAN entity for multi-stream communication. For example, the indication of the selected BPLs may be received via DCI or a MAC-CE. Each BPL 1122 may be associated with a different TRP of the m-TRP RAN entity. The selected BPLs 1122 may be stored, for example, in memory 1105 for use by the beam manager circuitry 1144 and communication and processing circuitry 1142 in the multi-stream communication. The beam manager circuitry 1144 may further be configured to execute beam manager instructions 1154 (e.g., software) stored in the computer-readable medium 1106 to implement one or more of the functions described herein.

Figure 12:
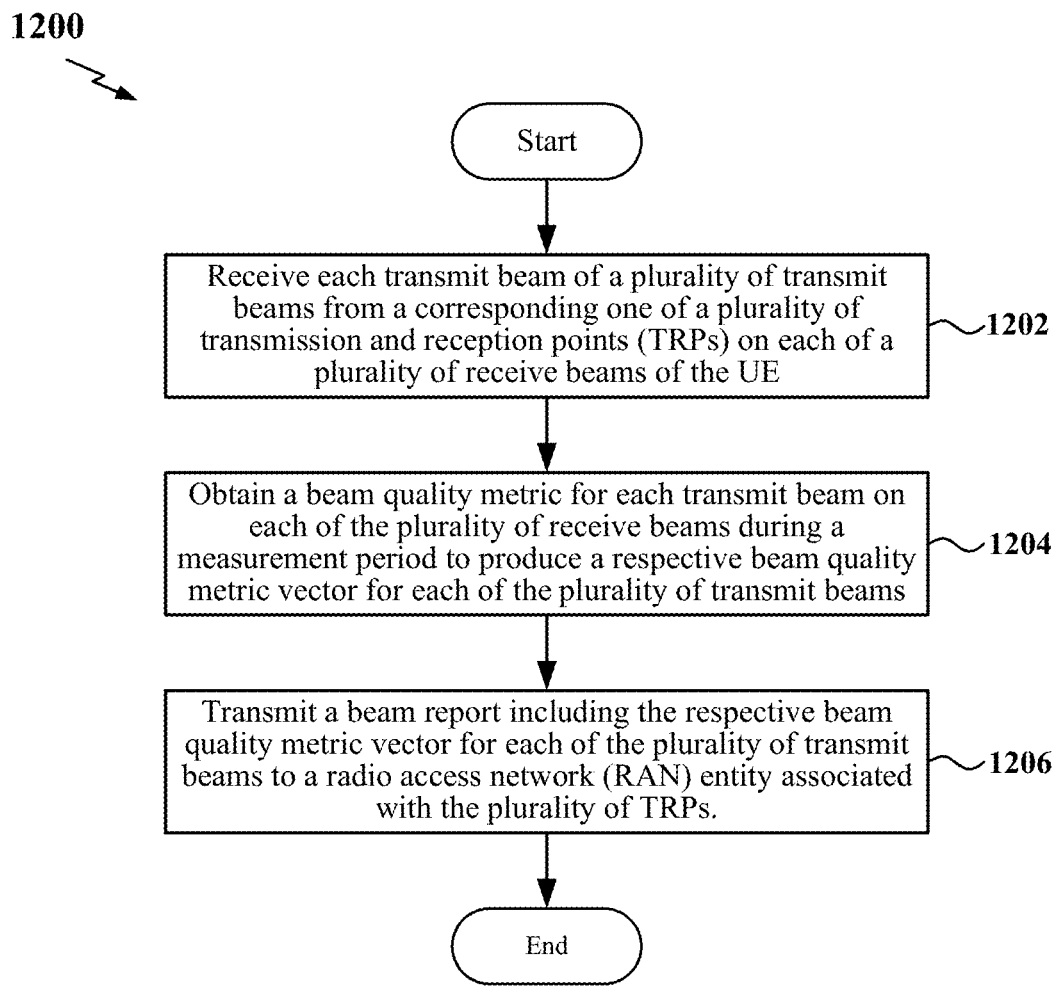
FIG. 12 is a flow chart of an exemplary method for beam management for multi-stream communication according to some aspects.

FIG. 12 is a flow chart 1200 illustrating an example of a method for beam management for multi-stream communication according to some aspects. As described below, some or all illustrated features may be omitted in a particular implementation within the scope of the present disclosure, and some illustrated features may not be required for implementation of all aspects. In some examples, the method may be performed by the UE 1100, as described above and illustrated in FIG. 11, by a processor or processing system, or by any suitable means for carrying out the described functions.

At block 1202, the UE may receive each transmit beam of a plurality of transmit beams from a corresponding one of a plurality of transmission and reception points (TRPs) on each of a plurality of receive beams of the UE. Here, each transmit beam may be received from a different TRP. In some examples, each of the plurality of receive beams is associated with a respective one of a plurality of antenna panels on the UE. In some examples, the UE may receive the plurality of transmit beams during a beam refinement procedure. For example, the beam manager circuitry 1144, together with the communication and processing circuitry 1142, transceiver 1110, and antenna array(s) 1130, shown and described above in connection with FIG. 11, may provide a means to receive the plurality of transmit beams from the plurality of TRPs on the plurality of receive beams.

At block 1204, the UE may obtain a beam quality metric for each transmit beam on each of the plurality of receive beams during a respective measurement period (e.g., in parallel or serially) to produce a respective beam quality metric vector for each of the plurality of transmit beams. In some examples, the beam quality metric may include at least one of a reference signal received power (RSRP), signal-to-interference-plus-noise ratio (SINR), or delay spread. In some examples, the beam quality metric includes the RSRP and each of the respective beam quality metric vectors includes an RSRP vector. The RSRP vectors for each of the plurality of transmit beams may indicate a respective mutual interference between each of the plurality of transmit beams. In some examples, the UE may receive a respective beam reference signal (e.g., SSB or CSI-RS) on each the plurality of transmit beams, and the respective beam quality metric for each of the plurality of transmit beams is obtained based on the respective beam reference signal. In some examples, each respective beam reference signal is received within a frequency band selected from FR2, FR4-a, FR4-1, FR4, or FR5. For example, the beam manager circuitry 1144 shown and described above in connection with FIG. 11 may provide a means to obtain the beam quality metrics during the respective measurement periods and generate the beam quality metric vectors for each of the plurality of transmit beams.

At block 1206, the UE may transmit a beam report including the respective beam quality metric vector for each of the plurality of transmit beams to a radio access network (RAN) entity associated with the plurality of TRPs. In some examples, the beam report may include an L1 measurement report. For example, the beam manager circuitry 1144, together with the communication and processing circuitry 1142, the transceiver 1110 and antenna array 1130 shown and described above in connection with FIG. 11 may provide a means to transmit the beam report to the RAN entity.

Figure 13:
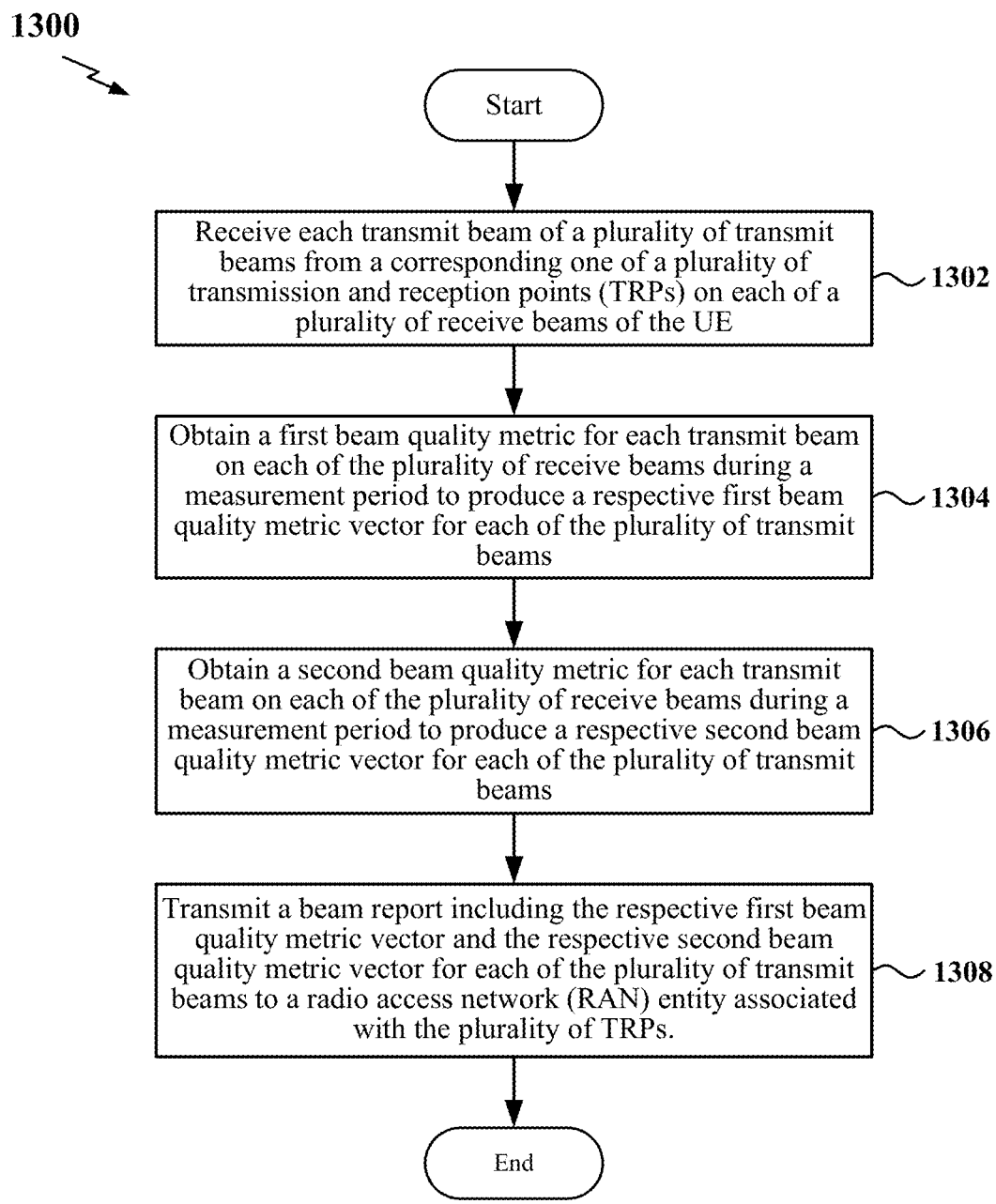
FIG. 13 is a flow chart of another exemplary method for beam management for multi-stream communication according to some aspects.

FIG. 13 is a flow chart 1300 illustrating another example of a method for beam management for multi-stream communication according to some aspects. As described below, some or all illustrated features may be omitted in a particular implementation within the scope of the present disclosure, and some illustrated features may not be required for implementation of all aspects. In some examples, the method may be performed by the UE 1100, as described above and illustrated in FIG. 11, by a processor or processing system, or by any suitable means for carrying out the described functions.

At block 1302, the UE may receive each transmit beam of a plurality of transmit beams from a corresponding one of a plurality of transmission and reception points (TRPs) on each of a plurality of receive beams of the UE. Here, each transmit beam may be received from a different TRP. In some examples, each of the plurality of receive beams is associated with a respective one of a plurality of antenna panels on the UE. In some examples, the UE may receive the plurality of transmit beams during a beam refinement procedure. For example, the beam manager circuitry 1144, together with the communication and processing circuitry 1142, transceiver 1110, and antenna array(s) 1130, shown and described above in connection with FIG. 11, may provide a means to receive the plurality of transmit beams from the plurality of TRPs on the plurality of receive beams.

At block 1304, the UE may obtain a first beam quality metric for each transmit beam on each of the plurality of receive beams during a respective measurement period (e.g., in parallel or serially) to produce a respective first beam quality metric vector for each of the plurality of transmit beams. In some examples, the first beam quality metric may include RSRP and each of the respective first beam quality metric vectors includes an RSRP vector. In some examples, the UE may receive a respective beam reference signal (e.g., SSB or CSI-RS) on each the plurality of transmit beams, and the respective first beam quality metric for each of the plurality of transmit beams is obtained based on the respective beam reference signal. In some examples, each respective beam reference signal is received within a frequency band selected from FR2, FR4-a, FR4-1, FR4, or FR5. For example, the beam manager circuitry 1144 shown and described above in connection with FIG. 11 may provide a means to obtain the first beam quality metrics during the respective measurement periods and generate the first beam quality metric vectors for each of the plurality of transmit beams.

At block 1306, the UE may obtain a second beam quality metric for each transmit beam on each of the plurality of receive beams during a respective measurement period (e.g., in parallel or serially) to produce a respective second beam quality metric vector for each of the plurality of transmit beams. In some examples, the second beam quality metric may include SINR or delay spread and each of the respective first beam quality metric vectors includes an SINR vector or a delay spread vector. In some examples, the UE may receive a respective beam reference signal (e.g., SSB or CSI-RS) on each the plurality of transmit beams, and the respective second beam quality metric for each of the plurality of transmit beams is obtained based on the respective beam reference signal. In some examples, each respective beam reference signal is received within a frequency band selected from FR2, FR4-a, FR4-1, FR4, or FR5. For example, the beam manager circuitry 1144 shown and described above in connection with FIG. 11 may provide a means to obtain the first beam quality metrics during the respective measurement periods and generate the first beam quality metric vectors for each of the plurality of transmit beams.

At block 1308, the UE may transmit a beam report including the respective first beam quality metric vector and the respective second beam quality metric vector for each of the plurality of transmit beams to a radio access network (RAN) entity associated with the plurality of TRPs. In some examples, the beam report may include an L1 measurement report. For example, the beam manager circuitry 1144, together with the communication and processing circuitry 1142, the transceiver 1110 and antenna array 1130 shown and described above in connection with FIG. 11 may provide a means to transmit the beam report to the RAN entity.

Figure 14:
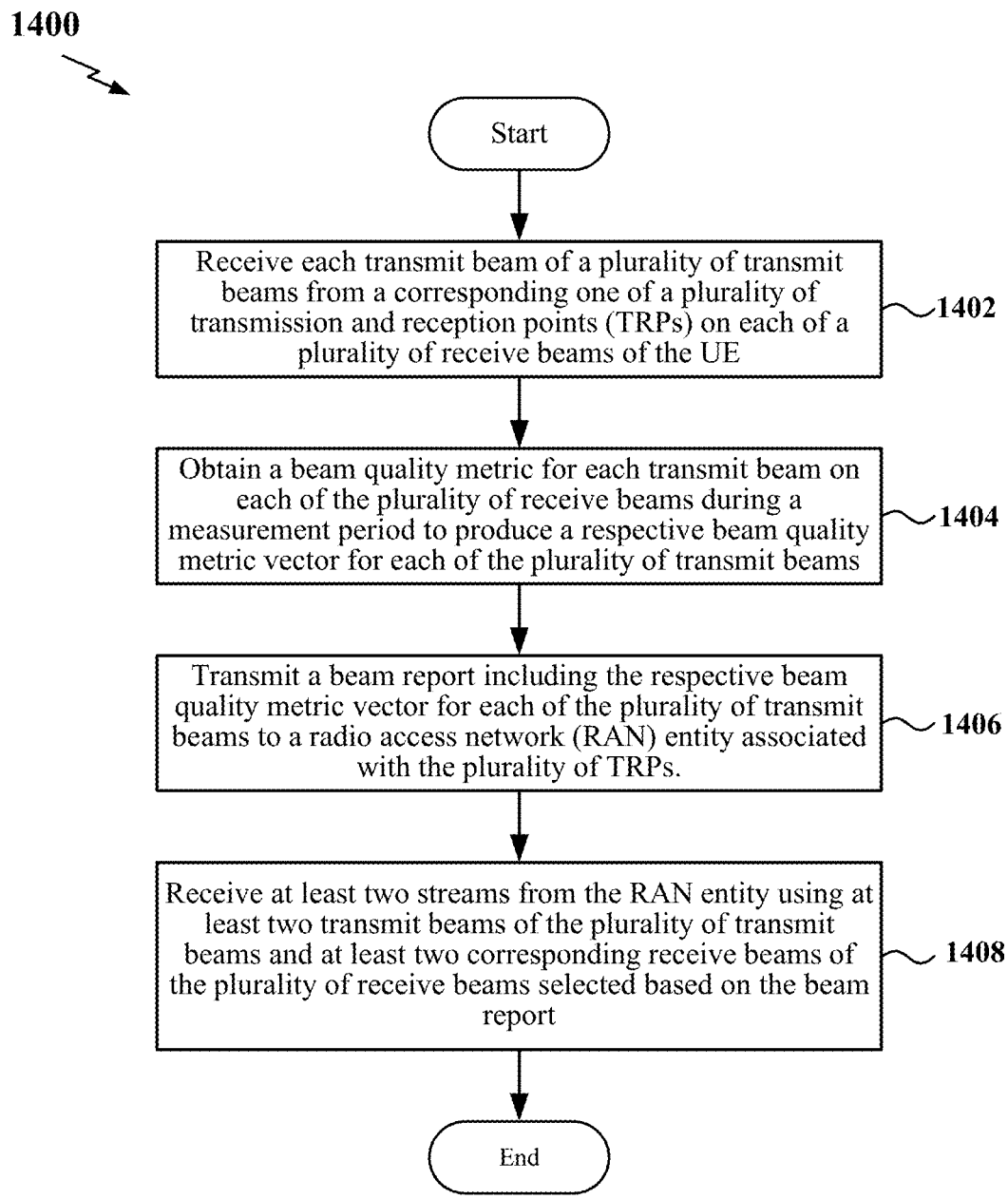
FIG. 14 is a flow chart of another exemplary method for beam management for multi-stream communication according to some aspects.

FIG. 14 is a flow chart 1400 illustrating another example of a method for beam management for multi-stream communication according to some aspects. As described below, some or all illustrated features may be omitted in a particular implementation within the scope of the present disclosure, and some illustrated features may not be required for implementation of all aspects. In some examples, the method may be performed by the UE 1100, as described above and illustrated in FIG. 11, by a processor or processing system, or by any suitable means for carrying out the described functions.

At block 1402, the UE may receive each transmit beam of a plurality of transmit beams from a corresponding one of a plurality of transmission and reception points (TRPs) on each of a plurality of receive beams of the UE. Here, each transmit beam may be received from a different TRP. In some examples, each of the plurality of receive beams is associated with a respective one of a plurality of antenna panels on the UE. In some examples, the UE may receive the plurality of transmit beams during a beam refinement procedure. For example, the beam manager circuitry 1144, together with the communication and processing circuitry 1142, transceiver 1110, and antenna array(s) 1130, shown and described above in connection with FIG. 11, may provide a means to receive the plurality of transmit beams from the plurality of TRPs on the plurality of receive beams.

At block 1404, the UE may obtain a beam quality metric for each transmit beam on each of the plurality of receive beams during a respective measurement period (e.g., in parallel or serially) to produce a respective beam quality metric vector for each of the plurality of transmit beams. In some examples, the beam quality metric may include at least one of a reference signal received power (RSRP), signal-to-interference-plus-noise ratio (SINR), or delay spread. In some examples, the beam quality metric includes the RSRP and each of the respective beam quality metric vectors includes an RSRP vector. The RSRP vectors for each of the plurality of transmit beams may indicate a respective mutual interference between each of the plurality of transmit beams. In some examples, the UE may receive a respective beam reference signal (e.g., SSB or CSI-RS) on each of the plurality of transmit beams, and the respective beam quality metric for each of the plurality of transmit beams is obtained based on the respective beam reference signal. In some examples, each respective beam reference signal is received within a frequency band selected from FR2, FR4-a, FR4-1, FR4, or FR5. For example, the beam manager circuitry 1144 shown and described above in connection with FIG. 11 may provide a means to obtain the beam quality metrics during the respective measurement periods and generate the beam quality metric vectors for each of the plurality of transmit beams.

At block 1406, the UE may transmit a beam report including the respective beam quality metric vector for each of the plurality of transmit beams to a radio access network (RAN) entity associated with the plurality of TRPs. In some examples, the beam report may include an L1 measurement report. For example, the beam manager circuitry 1144, together with the communication and processing circuitry 1142, the transceiver 1110 and antenna array 1130 shown and described above in connection with FIG. 11 may provide a means to transmit the beam report to the RAN entity.

At block 1408, the UE may receive at least two streams from the RAN entity using at least two transmit beams of the plurality of transmit beams and at least two corresponding receive beams of the plurality of receive beams selected based on the beam report. For example, the UE may receive the at least two streams from different respective TRPs of the plurality of TRPs using at least two corresponding beam pair links (BPLs), each including a respective transmit beam of the plurality of transmit beams and a respective receive beam of the plurality of receive beams. The BPLs may be selected by the RAN entity based on the beam report and utilized for spatial division multiplexing of the at least two streams. In some examples, the RAN entity may provide an indication of the selected BPLs for multi-stream communication to the UE via, for example, DCI or a MAC-CE. For example, the beam manager circuitry 1144, together with the communication and processing circuitry 1142, transceiver 1110, and antenna arrays 1130 shown and described above in connection with FIG. 11 may provide a means to receive the at least two streams from the RAN entity.

In one configuration, the UE 1100 includes means for performing the various functions and processes described in relation to FIGS. 12-14. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIG. 1,3-7, or 9, and utilizing, for example, the processes and/or algorithms described herein in relation to FIGS. 12-14.

Figure 15:
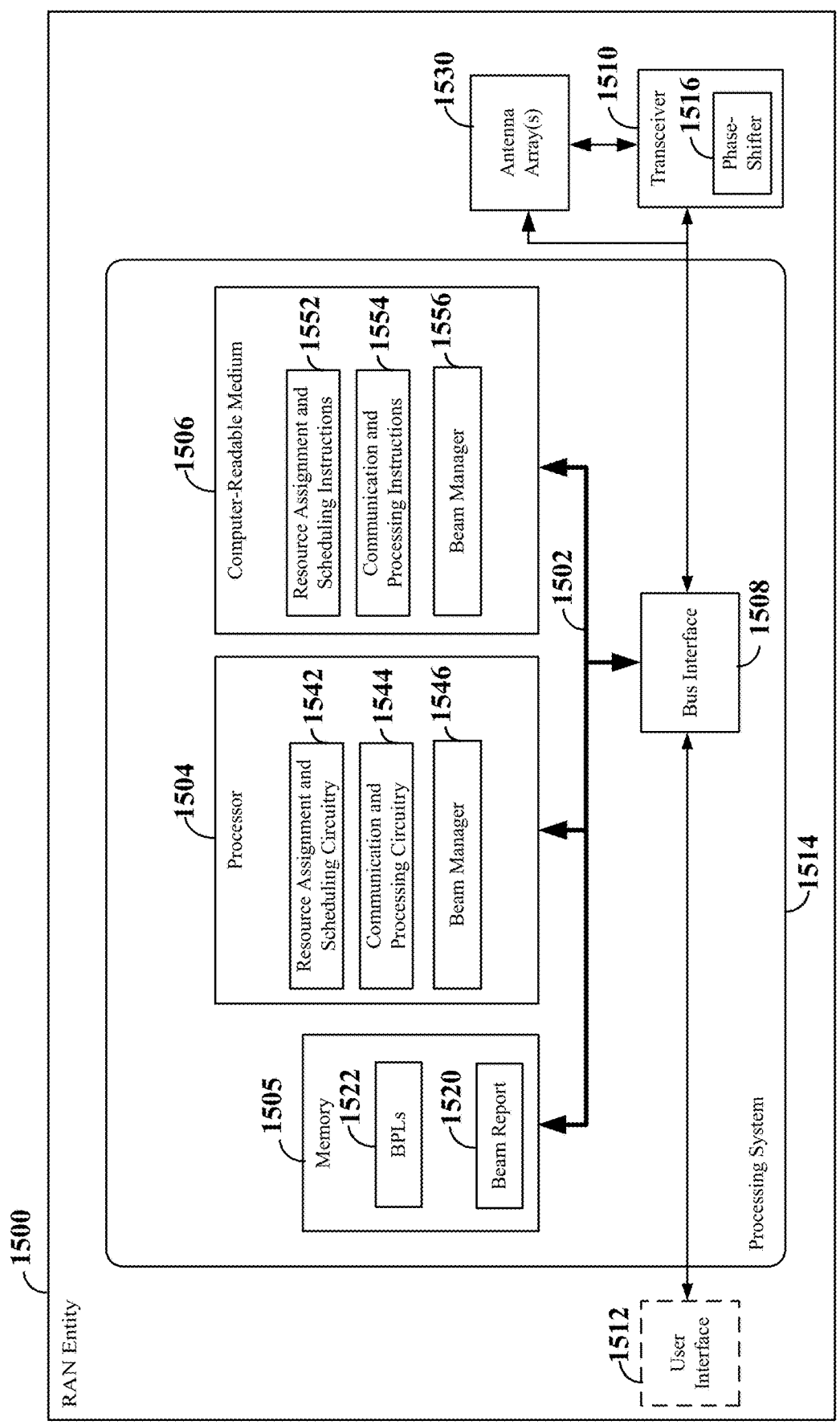
FIG. 15 is a block diagram illustrating an example of a hardware implementation for a radio access network (RAN) entity employing a processing system according to some aspects.

FIG. 15 is a conceptual diagram illustrating an example of a hardware implementation for an exemplary RAN entity 1500 employing a processing system 1514. For example, the RAN entity 1500 may correspond to any of the base stations (e.g., gNBs), TRPs (e.g., combined TRP and base station in a RRH configuration), or other scheduling entities illustrated in any one or more of FIG. 1,3-7, or 9.

In accordance with various aspects of the disclosure, an element, or any portion of an element, or any combination of elements may be implemented with a processing system 1514 that includes one or more processors 1504. The processing system 1514 may be substantially the same as the processing system 1114 illustrated in FIG. 11, including a bus interface 1508, a bus 1502, memory 1505, a processor 1504, and a computer-readable medium 1506. Furthermore, the RAN entity 1500 may include an optional user interface 1512 and a transceiver 1510 substantially similar to those described above in FIG. 11. In some examples, the transceiver 1510 may include a phase-shifter 1516 for digital and/or analog beamforming via one or more antenna array(s) 1530. The processor 1504, as utilized in a RAN entity 1500, may be used to implement any one or more of the processes described below.

In some aspects of the disclosure, the processor 1504 may include circuitry configured for various functions. For example, the processor 1504 may include resource assignment and scheduling circuitry 1542, configured to generate, schedule, and modify a resource assignment or grant of time-frequency resources (e.g., a set of one or more resource elements). For example, the resource assignment and scheduling circuitry 1542 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1542 may be configured to schedule resources for the transmission of a plurality of transmit beams, each carrying a beam reference signal, from a plurality of TRPs associated with the RAN entity 1500. For example, the transmit beams may be scheduled during a beam refinement procedure or other beam management procedure in which a beam report may be received from a UE. The resource assignment and scheduling circuitry 1542 may schedule at least one transmit beam from each TRP or from a subset of the TRPs (e.g., active TRPs for the UE). The resource assignment and scheduling circuitry 1542 may further be configured to schedule transmission by the UE of the beam report to the RAN entity 1500. In addition, the resource assignment and scheduling circuitry 1542 may be configured to schedule transmission of multiple spatially division multiplexed data streams, each from a respective TRP, to the UE. The resource assignment and scheduling circuitry 1542 may further be configured to execute resource assignment and scheduling software 1552 stored in the computer-readable medium 1506 to implement one or more of the functions described herein.

The processor 1504 may further include communication and processing circuitry 1544, configured to communicate with the UE. In some examples, the communication and processing circuitry 1544 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1544 may be configured to receive and process uplink beamformed signals at a mmWave frequency or a sub-6 GHz frequency via the transceiver 1510 and the antenna array 1530 (e.g., using the phase-shifter 1516). In addition, the communication and processing circuitry 1544 may be configured to generate and transmit uplink beamformed signals at a mmWave frequency or a sub-6 GHz frequency via the transceiver 1510 and antenna array 1530 (e.g., using the phase-shifter 1516). For example, the communication and processing circuitry 1544 may be configured for multi-stream communication with the UE entity via spatial division multiplexing (SDM) the multiple streams on corresponding multiple beam pair links (BPLs) between the UE and respective TRPs of the RAN entity 1500.

The communication and processing circuitry 1544 may further be configured to transmit a plurality of transmit beams from a plurality of TRPs of the RAN entity 1500 via the antenna arrays 1530 and transceiver 1510. Each of the transmit beams may carry a respective beam reference signal (e.g., an SSB or CSI-RS). The communication and processing circuitry 1544 may further be configured to receive a beam report (e.g., an L1 measurement report) from the UE. The communication and processing circuitry 1544 may further be configured to execute communication and processing software 1554 stored in the computer-readable medium 1506 to implement one or more of the functions described herein.

The processor 1504 may further include beam manager circuitry 1546, configured to perform beam management for SDM multi-stream communication. The beam manager circuitry 1546 may correspond, for example, to any of the base station (or RAN entity) beam managers shown in FIGS. 1 and/or 3-7. The beam manager circuitry 1546 may be configured to perform beam management for SDM multi-stream communication during a beam refinement procedure (e.g., P2 procedure) or other beam management procedure in which a beam report is generated.

For example, the beam manager circuitry 1546 may be configured to operate together with the resource assignment and scheduling circuitry 1542 and communication and processing circuitry 1544 to generate and transmit the plurality of transmit beams to the UE. The beam manager circuitry 1546 may further be configured to receive a beam report 1520 from the UE and to store the beam report 1520, for example, in memory 1505. The beam manager circuitry 1546 may further be configured to utilize the beam report 1520 to select two or more BPLs 1522 for multi-stream communication with the UE and to store the selected BPLs 1522, for example, in memory 1505. For example, the beam report may include a respective beam quality metric vector for each of the plurality of transmit beams. Each beam quality metric vector may include a respective beam quality metric obtained during a respective measurement period in parallel or serially on each of a plurality of receive beams of the UE.

In some examples, the beam quality metric vectors may include RSRP vectors. The beam manager circuitry 1546 may select the BPLs (e.g., transmit beam on one of the TRPs and corresponding receive beam on the UE) with the strongest RSRP that also have the minimum mutual interference therebetween. Here, the strongest RSRP may include an RSRP above a threshold amount. For example, the beam manager circuitry 1546 may utilize the respective RSRP vectors of each of the transmit beams to identify a set of candidate BPLs associated with each of the TRPs having the strongest RSRP values. From the set of candidate BPLs, the beam manager circuitry 1546 may select the two or more BPLs with the minimum mutual interference therebetween. In some examples, the beam manager circuitry 1546 may include at least one BPL associated with each of the TRPs in the set of candidate BPLs and select a single BPL from two or more of the TRPs for multi-stream communication with the UE based on at least the mutual interference between each of the candidate BPLs. In some examples, the beam report may further include other beam quality metric vector(s) (e.g., SINR or delay spread vectors) associated with each of the transmit beams. In this example, the beam manager circuitry 1546 may select the BPLs further utilizing the other beam quality metric vectors. For example, the beam manager circuitry 1546 may utilize the other beam quality metric vector(s) to select the BPLs 1522 when there are multiple candidate BPLs that provide a minimum mutual interference therebetween.

The beam manager circuitry 1546 may further be configured to transmit an indication of the two or more selected BPLs 1522 selected for multi-stream communication to the UE. For example, the indication of the selected BPLs may be transmitted via DCI or a MAC-CE. The beam manager circuitry 1546 and communication and processing circuitry 1544 may further utilize the selected BPLs 1522 to transmit the multiple streams to the UE. The beam manager circuitry 1546 may further be configured to execute beam manager instructions 1556 (e.g., software) stored in the computer-readable medium 1506 to implement one or more of the functions described herein.

Figure 16:
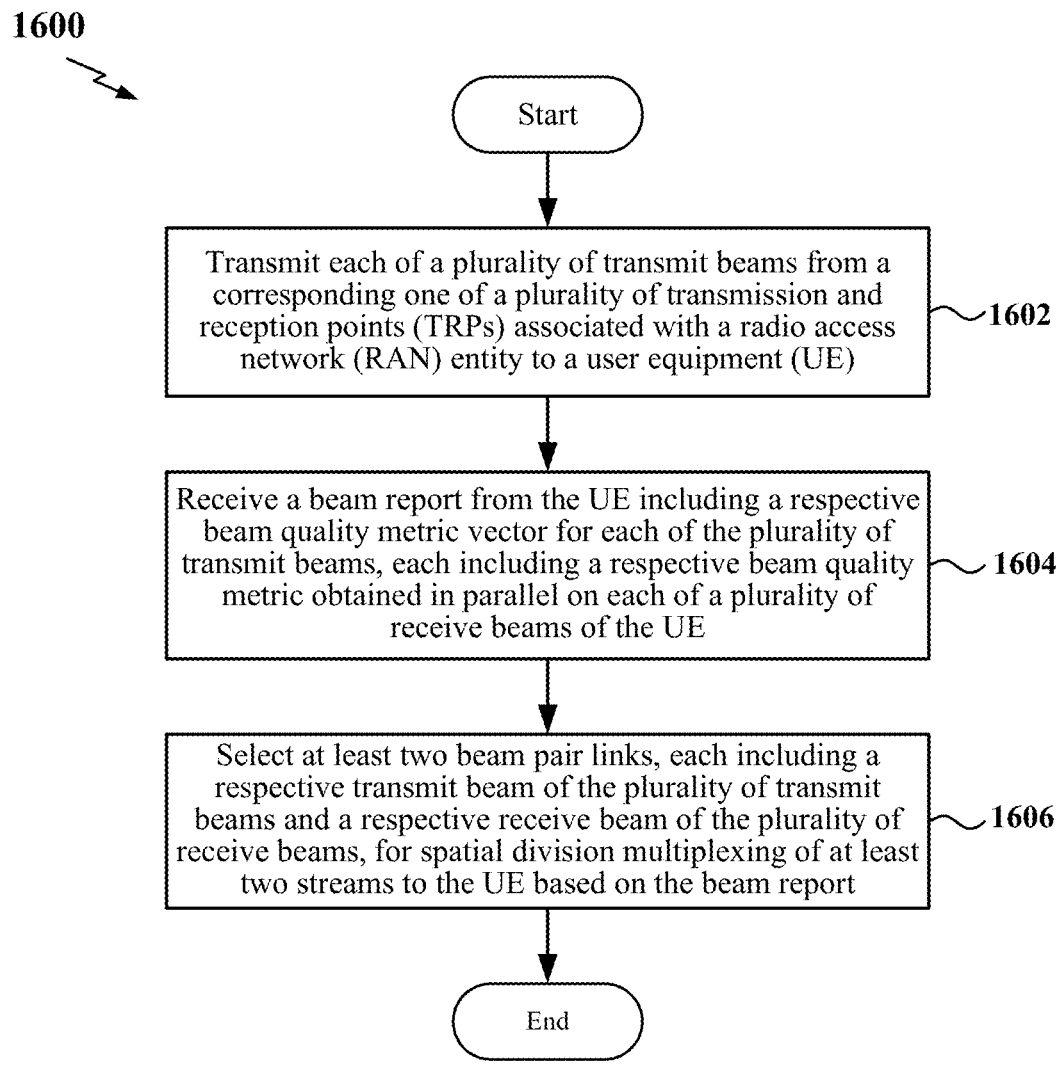
FIG. 16 is a flow chart of another exemplary method for beam management for multi-stream communication according to some aspects.

FIG. 16 is a flow chart 1600 illustrating another example of a method for beam management for multi-stream communication according to some aspects. As described below, some or all illustrated features may be omitted in a particular implementation within the scope of the present disclosure, and some illustrated features may not be required for implementation of all aspects. In some examples, the method may be performed by the RAN entity 1500, as described above and illustrated in FIG. 15, by a processor or processing system, or by any suitable means for carrying out the described functions.

At block 1602, the RAN entity may transmit each of a plurality of transmit beams from a corresponding one of a plurality of transmission and reception points (TRPs) associated with the RAN entity to a user equipment (UE). Here, each transmit beam may be transmitted from a different TRP. In some examples, the RAN entity may transmit a respective beam reference signal (e.g., SSB or CSI-RS) on each of the plurality of transmit beams. In some examples, the RAN entity may transmit the plurality of transmit beams during a beam refinement procedure. In some examples, each respective beam reference signal is transmitted within a frequency band selected from FR2, FR4-a, FR4-1, FR4, or FR5. For example, the beam manager circuitry 1546, together with the communication and processing circuitry 1544, transceiver 1510, and antenna array(s) 1530, shown and described above in connection with FIG. 15, may provide a means to transmit the plurality of transmit beams to the UE.

At block 1604, the RAN entity may receive a beam report from the UE including a respective beam quality metric vector for each of the plurality of transmit beams, each including a respective beam quality metric obtained during a respective measurement period (e.g., in parallel or serially) on each of a plurality of receive beams of the UE. In some examples, each of the plurality of receive beams is associated with a respective one of a plurality of antenna panels on the UE. In some examples, the respective beam quality metric vector for each of the plurality of transmit beams is obtained based on the respective beam reference signal carried on each of the transmit beams. In some examples, the respective beam quality metric vector comprises at least one of a reference signal received power (RSRP) vector, signal-to-interference-plus-noise ratio (SINR) vector, or delay spread vector. In some examples, the beam report includes a respective first beam quality metric vector for each of the plurality of transmit beams and a respective second beam quality metric vector for each of the plurality of transmit beams. The first beam quality metric vector can include, for example, an RSRP vector and the second beam quality metric vector can include one of an SINR vector or a delay spread vector. For example, the beam manager circuitry 1546, together with the communication and processing circuitry 1544, transceiver 1510, and antenna array(s) 1530, shown and described above in connection with FIG. 15, may provide a means to receive the beam report from the UE.

At block 1606, the RAN entity may select at least two beam pair links, each including a respective transmit beam of the plurality of transmit beams and a respective receive beam of the plurality of receive beams, for spatial division multiplexing of at least two streams to the UE based on the beam report. Each of the BPLs may be associated with a different respective TRP of the plurality of TRPs associated with the RAN entity. For example, the beam manager circuitry 1546 shown and described above in connection with FIG. 15 may provide a means to select the at least two beam pair links.

Figure 17:
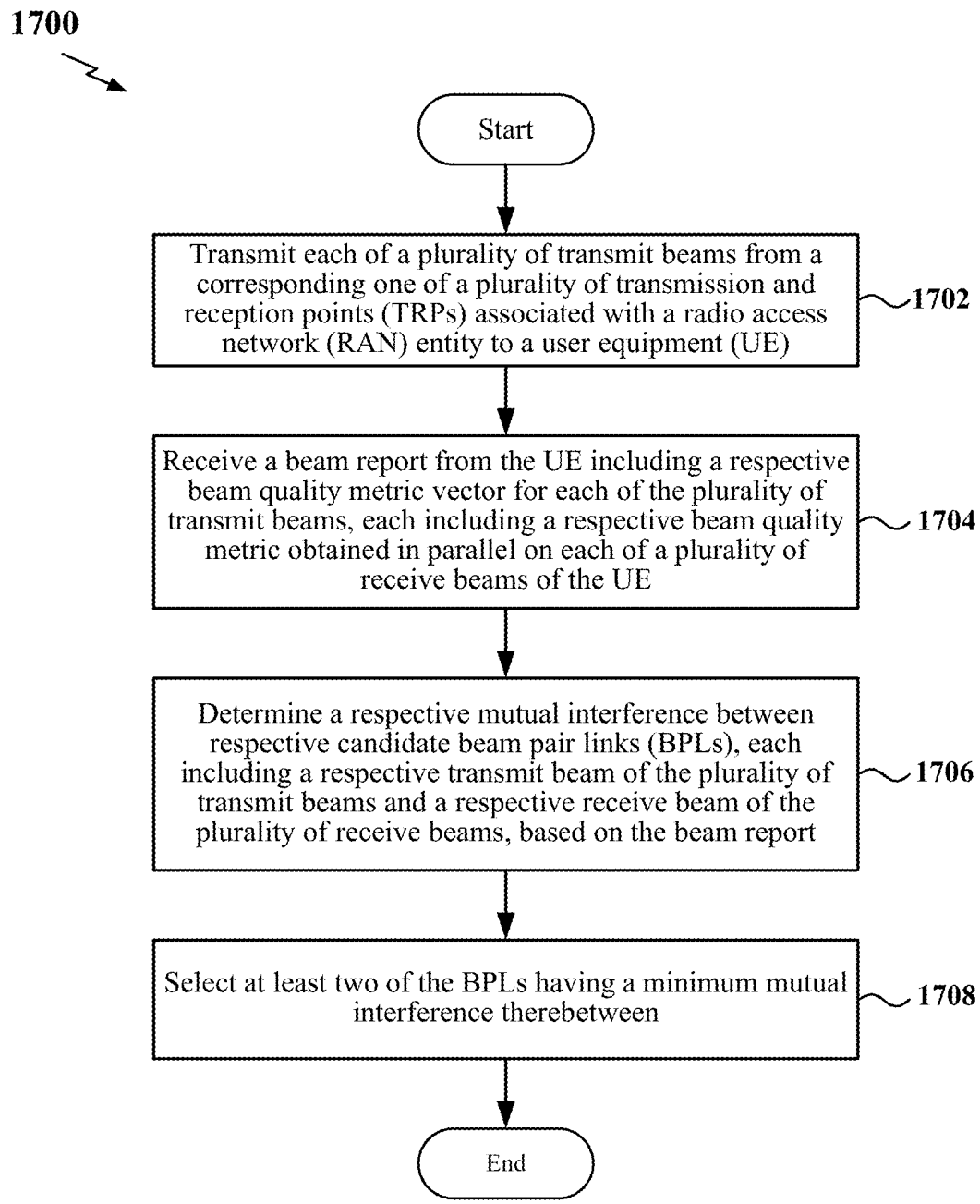
FIG. 17 is a flow chart of another exemplary method for beam management for multi-stream communication according to some aspects.

FIG. 17 is a flow chart 1700 illustrating another example of a method for beam management for multi-stream communication according to some aspects. As described below, some or all illustrated features may be omitted in a particular implementation within the scope of the present disclosure, and some illustrated features may not be required for implementation of all aspects. In some examples, the method may be performed by the RAN entity 1500, as described above and illustrated in FIG. 15, by a processor or processing system, or by any suitable means for carrying out the described functions.

At block 1702, the RAN entity may transmit each of a plurality of transmit beams within a frequency band from a corresponding one of a plurality of transmission and reception points (TRPs) associated with the RAN entity to a user equipment (UE). Here, each transmit beam may be transmitted from a different TRP. In some examples, the RAN entity may transmit a respective beam reference signal (e.g., SSB or CSI-RS) on each of the plurality of transmit beams. In some examples, the RAN entity may transmit the plurality of transmit beams during a beam refinement procedure. In some examples, each respective beam reference signal is transmitted within a frequency band selected from FR2, FR4-a, FR4-1, FR4, or FR5. For example, the beam manager circuitry 1546, together with the communication and processing circuitry 1544, transceiver 1510, and antenna array(s) 1530, shown and described above in connection with FIG. 15, may provide a means to transmit the plurality of transmit beams to the UE.

At block 1704, the RAN entity may receive a beam report from the UE including a respective beam quality metric vector for each of the plurality of transmit beams, each including a respective beam quality metric obtained during a respective measurement period (e.g., in parallel or serially) on each of a plurality of receive beams of the UE. In some examples, each of the plurality of receive beams is associated with a respective one of a plurality of antenna panels on the UE. In some examples, the respective beam quality metric vector for each of the plurality of transmit beams is obtained based on the respective beam reference signal carried on each of the transmit beams. In some examples, the respective beam quality metric vector comprises at least one of a reference signal received power (RSRP) vector, signal-to-interference-plus-noise ratio (SINR) vector, or delay spread vector. In some examples, the beam report includes a respective first beam quality metric vector for each of the plurality of transmit beams and a respective second beam quality metric vector for each of the plurality of transmit beams. The first beam quality metric vector can include, for example, an RSRP vector and the second beam quality metric vector can include one of an SINR vector or a delay spread vector. For example, the beam manager circuitry 1546, together with the communication and processing circuitry 1544, transceiver 1510, and antenna array(s) 1530, shown and described above in connection with FIG. 15, may provide a means to receive the beam report from the UE.

At block 1706, the RAN entity may determine a respective mutual interference between respective candidate beam pair links (BPLs), each including a respective transmit beam of the plurality of transmit beams and a respective receive beam of the plurality of receive beams, based on the beam report. For example, the beam report may include a respective RSRP vector for each of the transmit beams, and the RAN entity may identify the candidate BPLs as the BPLs having the strongest RSRP (e.g., RSRP above a threshold). The RAN entity may then determine the respective mutual interference between candidate BPLs on different TRPs. For example, the beam manager circuitry 1546 shown and described above in connection with FIG. 15 may provide a means to determine the respective mutual interference between respective candidate BPLs.

At block 1708, the RAN entity may select at least two BPLs having a minimum mutual interference therebetween. The selected BPLs may be utilized for spatial division multiplexing of at least two streams to the UE. Each of the BPLs may be associated with a different respective TRP of the plurality of TRPs associated with the RAN entity. For example, the beam manager circuitry 1546 shown and described above in connection with FIG. 15 may provide a means to select the at least two BPLs.

In one configuration, the RAN entity 1500 includes means for performing the various functions and processes described in relation to FIGS. 16 and 17. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIG. 1, 3-7, or 9, and utilizing, for example, the processes and/or algorithms described herein in relation to FIGS. 16 and 17.

The following provides an overview of examples of the present disclosure.

Example 1: A method for wireless communication at a user equipment (UE) in a wireless communication network, the method comprising: receiving each transmit beam of a plurality of transmit beams from a corresponding one of a plurality of transmission and reception points (TRPs) on each of a plurality of receive beams of the UE; for each of the plurality of transmit beams, obtaining a beam quality metric on each of the plurality of receive beams during a measurement period to produce a respective beam quality metric vector for each of the plurality of transmit beams; and transmitting, to a radio access network (RAN) entity associated with the plurality of TRPs, a beam report comprising the respective beam quality metric vector for each of the plurality of transmit beams.

Example 2: The method of example 1, wherein the beam quality metric comprises at least one of a reference signal received power (RSRP), signal-to-interference-plus-noise ratio (SINK), or delay spread.

Example 3: The method of example 1 or 2, wherein the beam quality metric comprises the RSRP and each of the respective beam quality metric vectors comprises an RSRP vector.

Example 4: The method of any of examples 1 through 3, wherein the RSRP vectors for each of the plurality of transmit beams indicate a respective mutual interference between each of the plurality of transmit beams.

Example 5: The method of any of examples 1 through 4, wherein the beam report comprises a respective first beam quality metric vector for each of the plurality of transmit beams and a respective second beam quality metric vector for each of the plurality of transmit beams, the first beam quality metric vector comprises an RSRP vector and the second beam quality metric vector comprises one of an SINR vector or a delay spread vector.

Example 6: The method of any of examples 1 through 5, wherein the receiving the plurality of transmit beams further comprises: receiving a respective beam reference signal on each of the plurality of transmit beams, wherein the respective beam quality metric for each of the plurality of transmit beams is obtained based on the respective beam reference signal.

Example 7: The method of example 6, wherein each of the respective beam reference signals is received within a frequency band selected from FR2, FR4, FR4-a, FR4-1, or FR5.

Example 8: The method of any of examples 1 through 7, wherein the receiving the plurality of transmit beams further comprises: receiving the plurality of transmit beams during a beam refinement procedure.

Example 9: The method of any of examples 1 through 8, wherein each of the plurality of receive beams is associated with a respective one of a plurality of antenna panels on the UE.

Example 10: The method of any of examples 1 through 9, further comprising: receiving at least two streams from different respective TRPs of the plurality of TRPs using at least two corresponding beam pair links, each comprising a respective transmit beam of the plurality of transmit beams and a respective receive beam of the plurality of receive beams, selected based on the beam report for spatial division multiplexing of the at least two streams.

Example 11: The method of any of examples 1 through 10, wherein the obtaining the beam quality metric on each of the plurality of receive beams during the measurement period comprises: for each of the plurality of transmit beams, obtaining the beam quality metric on each of the plurality of receive beams in parallel during the measurement period to generate the respective beam quality metric vector for each of the plurality of transmit beams.

Example 12: The method of any of examples 1 through 10, wherein the obtaining the beam quality metric on each of the plurality of receive beams during the measurement period comprises: for each of the plurality of transmit beams, obtaining the beam quality metric on each of the plurality of receive beams serially during the measurement period to generate the respective beam quality metric vector for each of the plurality of transmit beams.

Example 13: A user equipment (UE) configured for wireless communication comprising a processor, and a memory coupled to the processor, the processor and memory configured to perform a method of any one of examples 1 through 12.

Example 14: An apparatus configured for wireless communication comprising at least one means for performing a method of any one of examples 1 through 12.

Example 15: A non-transitory computer-readable medium storing computer-executable code, comprising code for causing an apparatus to perform a method of any one of examples 1 through 12.

Example 16: A method for wireless communication at a radio access network (RAN) entity in a wireless communication network, the method comprising: transmitting each of a plurality of transmit beams from a corresponding one of a plurality of transmission and reception points (TRPs) associated with the RAN entity to a user equipment (UE); receiving a beam report from the UE, the beam report comprising, for each of the plurality of transmit beams, a respective beam quality metric vector comprising a respective beam quality metric obtained during a measurement period on each of a plurality of receive beams of the UE; and selecting at least two beam pair links, each comprising a respective transmit beam of the plurality of transmit beams and a respective receive beam of the plurality of receive beams and each associated with a different respective TRP of the plurality of TRPs, for spatial division multiplexing of at least two streams to the UE based on the beam report.

Example 17: The method of example 16, wherein the respective beam quality metric vector comprises at least one of a reference signal received power (RSRP) vector, signal-to-interference-plus-noise ratio (SINK) vector, or delay spread vector.

Example 18: The method of example 16 or 17, wherein the RSRP vectors for each of the plurality of transmit beams indicate a respective mutual interference between each of the plurality of transmit beams, and wherein selecting the at least two transmit beams further comprises: selecting the at least two beam pair links comprising a minimum mutual interference therebetween.

Example 19: The method of any of examples 16 through 18, wherein the beam report comprises a respective first beam quality metric vector for each of the plurality of transmit beams and a respective second beam quality metric vector for each of the plurality of transmit beams, the first beam quality metric vector comprises an RSRP vector and the second beam quality metric vector comprises one of an SINR vector or a delay spread vector.

Example 20: The method of any of examples 16 through 19, wherein the transmitting the plurality of transmit beams further comprises: transmitting a respective beam reference signal on each the plurality of transmit beams, wherein the respective beam quality metric vector for each of the plurality of transmit beams is obtained based on the respective beam reference signal.

Example 21: The method of example 20, wherein each of the respective beam reference signals is transmitted within a frequency band selected from FR2, FR4, FR4-a, FR4-1, or FR5.

Example 22: The method of any of examples 16 through 21, wherein the transmitting the plurality of transmit beams further comprises: transmitting the plurality of transmit beams during a beam refinement procedure.

Example 23: The method of any of examples 18 through 22, wherein each of the plurality of receive beams is associated with a respective one of a plurality of antenna panels on the UE.

Example 24: A radio access network (RAN) entity configured for wireless communication comprising a processor, and a memory coupled to the processor, the processor and memory configured to perform a method of any one of examples 18 through 23.

Example 25: An apparatus configured for wireless communication comprising at least one means for performing a method of any one of examples 18 through 23.

Example 26: A non-transitory computer-readable medium storing computer-executable code, comprising code for causing an apparatus to perform a method of any one of examples 18 through 23.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1,3-7, 9, 10A, 10B, 11, and/or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE) in a wireless communication network, the method comprising:
receiving each transmit beam of a plurality of transmit beams from a corresponding one of a plurality of transmission and reception points (TRPs) on each of a plurality of receive beams of the UE;
for each of the plurality of transmit beams, obtaining a beam quality metric on each of the plurality of receive beams during a measurement period to produce a respective beam quality metric vector for each of the plurality of transmit beams, the beam quality metric comprising at least one of a reference signal received power (RSRP), signal-to-interference-plus-noise ratio (SINR), or delay spread; and
transmitting, to a radio access network (RAN) entity associated with the plurality of TRPs, a beam report comprising the respective beam quality metric vector for each of the plurality of transmit beams, the beam report comprising a respective first beam quality metric vector for each of the plurality of transmit beams and a respective second beam quality metric vector for each of the plurality of transmit beams, the first beam quality metric vector comprising an RSRP vector and the second beam quality metric vector comprising one of an SINR vector or a delay spread vector.

2. The method of claim 1, wherein the beam quality metric comprises the RSRP and each of the respective beam quality metric vectors comprises an RSRP vector.

3. The method of claim 2, wherein the RSRP vectors for each of the plurality of transmit beams indicate a respective mutual interference between each of the plurality of transmit beams.

4. The method of claim 1, wherein the receiving the plurality of transmit beams further comprises:
receiving a respective beam reference signal on each of the plurality of transmit beams, wherein the respective beam quality metric for each of the plurality of transmit beams is obtained based on the respective beam reference signal.

5. The method of claim 4, wherein each of the respective beam reference signals is received within a frequency band selected from FR2, FR4, FR4-a, FR4-1, or FR5.

6. The method of claim 1, wherein the receiving the plurality of transmit beams further comprises:
receiving the plurality of transmit beams during a beam refinement procedure.

7. The method of claim 1, wherein each of the plurality of receive beams is associated with a respective one of a plurality of antenna panels on the UE.

8. The method of claim 1, further comprising:
receiving at least two streams from different respective TRPs of the plurality of TRPs using at least two corresponding beam pair links, each comprising a respective transmit beam of the plurality of transmit beams and a respective receive beam of the plurality of receive beams, selected based on the beam report for spatial division multiplexing of the at least two streams.

9. The method of claim 1, wherein the obtaining the beam quality metric on each of the plurality of receive beams during the measurement period comprises:
for each of the plurality of transmit beams, obtaining the beam quality metric on each of the plurality of receive beams in parallel during the measurement period to generate the respective beam quality metric vector for each of the plurality of transmit beams.

10. The method of claim 1, wherein the obtaining the beam quality metric on each of the plurality of receive beams during the measurement period comprises:
for each of the plurality of transmit beams, obtaining the beam quality metric on each of the plurality of receive beams serially during the measurement period to generate the respective beam quality metric vector for each of the plurality of transmit beams.

11. The method of claim 1, wherein the beam quality metric comprises the RSRP and the SINR and the second beam quality metric vector comprises the SINR vector.

12. The method of claim 1, wherein the beam quality metric comprises the RSRP and the delay spread and the second beam quality metric vector comprises the delay spread vector.

13. A user equipment (UE) configured for wireless communication, comprising:
a processor; and
a memory coupled to the processor, the processor being configured to:
receive each transmit beam of a plurality of transmit beams from a corresponding one of a plurality of transmission and reception points (TRPs) on each of a plurality of receive beams of the UE;
for each of the plurality of transmit beams, obtain a beam quality metric on each of the plurality of receive beams during a measurement period to generate a respective beam quality metric vector for each of the plurality of transmit beams, the beam quality metric comprising at least one of a reference signal received power (RSRP), signal-to-interference-plus-noise ratio (SINR), or delay spread; and
transmit, to a radio access network (RAN) entity associated with the plurality of TRPs, a beam report comprising the respective beam quality metric vector for each of the plurality of transmit beams, the beam report comprising a respective first beam quality metric vector for each of the plurality of transmit beams and a respective second beam quality metric vector for each of the plurality of transmit beams, the first beam quality metric vector comprising an RSRP vector and the second beam quality metric vector comprising one of an SINR vector or a delay spread vector.

14. The UE of claim 13, wherein the beam quality metric comprises the RSRP and each of the respective beam quality metric vectors comprises an RSRP vector, and the RSRP vectors for each of the plurality of transmit beams indicate a respective mutual interference between each of the plurality of transmit beams.

15. The UE of claim 13, further comprising:
a transceiver coupled to the processor, wherein the processor and the memory are is further configured to:
receive a respective beam reference signal on each of the plurality of transmit beams via the transceiver, wherein the respective beam quality metric for each of the plurality of transmit beams is obtained based on the respective beam reference signal.

16. The UE of claim 13, wherein each of the plurality of receive beams is associated with a respective one of a plurality of antenna panels on the UE.

17. The UE of claim 13, wherein the processor is further configured to:
receive at least two streams from different respective TRPs of the plurality of TRPs using at least two corresponding beam pair links, each comprising a respective transmit beam of the plurality of transmit beams and a respective receive beam of the plurality of receive beams, selected based on the beam report for spatial division multiplexing of the at least two streams.

18. The UE of claim 13, wherein the processor is further configured to:
for each of the plurality of transmit beams, obtain the beam quality metric on each of the plurality of receive beams in parallel during the measurement period to generate the respective beam quality metric vector for each of the plurality of transmit beams.

19. The UE of claim 13, wherein the beam quality metric comprises the RSRP and the SINR and the second beam quality metric vector comprises the SINR vector.

20. The UE of claim 13, wherein the beam quality metric comprises the RSRP and the delay spread and the second beam quality metric vector comprises the delay spread vector.

21. A method for wireless communication at a radio access network (RAN) entity in a wireless communication network, the method comprising:
providing each of a plurality of transmit beams from a corresponding one of a plurality of transmission and reception points (TRPs) associated with the RAN entity;
receiving a beam report of a UE, the beam report comprising, for each of the plurality of transmit beams, a respective beam quality metric vector comprising a respective beam quality metric obtained during a measurement period on each of a plurality of receive beams of the UE, the respective beam quality metric vector comprising at least one of a reference signal received power (RSRP) vector, signal-to-interference-plus-noise ratio (SINR) vector, or delay spread vector, the beam report comprising a respective first beam quality metric vector for each of the plurality of transmit beams and a respective second beam quality metric vector for each of the plurality of transmit beams, the first beam quality metric vector comprising an RSRP vector and the second beam quality metric vector comprising one of an SINR vector or a delay spread vector; and
selecting at least two beam pair links, each comprising a respective transmit beam of the plurality of transmit beams and a respective receive beam of the plurality of receive beams and each associated with a different respective TRP of the plurality of TRPs, to spatial division multiplex at least two streams to the UE based on the beam report.

22. The method of claim 21, wherein the RSRP vectors for each of the plurality of transmit beams indicate a respective mutual interference between each of the plurality of transmit beams, and wherein selecting the at least two transmit beams further comprises:
selecting the at least two beam pair links comprising a minimum mutual interference therebetween.

23. The method of claim 21, wherein the providing the plurality of transmit beams further comprises:
providing a respective beam reference signal on each of the plurality of transmit beams, wherein the respective beam quality metric vector for each of the plurality of transmit beams is obtained based on the respective beam reference signal.

24. The method of claim 23, wherein each of the respective beam reference signals is transmitted within a frequency band selected from FR2, FR4, FR4-a, FR4-1, or FR5.

25. The method of claim 21, wherein the providing the plurality of transmit beams further comprises:
providing the plurality of transmit beams during a beam refinement procedure.

26. The method of claim 21, wherein each of the plurality of receive beams is associated with a respective one of a plurality of antenna panels on the UE.

27. The method of claim 21, wherein the second beam quality metric vector comprises the SINR vector.

28. The method of claim 21, wherein the second beam quality metric vector comprises the delay spread vector.

29. A radio access network (RAN) entity configured for wireless communication, comprising:
a processor; and
a memory coupled to the processor, the processor being configured to:
provide each of a plurality of transmit beams from a corresponding one of a plurality of transmission and reception points (TRPs) associated with the RAN entity;
receive a beam report of a user equipment (UE), the beam report comprising, for each of the plurality of transmit beams, a respective beam quality metric vector comprising a respective beam quality metric obtained in parallel on each of a plurality of receive beams of the UE, the respective beam quality metric vector comprising at least one of a reference signal received power (RSRP) vector, signal-to-interference-plus-noise ratio (SINR) vector, or delay spread vector, the beam report comprising a respective first beam quality metric vector for each of the plurality of transmit beams and a respective second beam quality metric vector for each of the plurality of transmit beams, the first beam quality metric vector comprising an RSRP vector and the second beam quality metric vector comprising one of an SINR vector or a delay spread vector; and
select at least two beam pair links, each comprising a respective transmit beam of the plurality of transmit beams and a respective receive beam of the plurality of receive beams and each associated with a different respective TRP of the plurality of TRPs, to spatial division multiplex at least two streams to the UE based on the beam report.

30. The RAN entity of claim 29, further comprising:
a transceiver coupled to the processor, wherein the RSRP vectors for each of the plurality of transmit beams indicate a respective mutual interference between each of the plurality of transmit beams, and wherein the processor is further configured to:
select the at least two beam pair links comprising a minimum mutual interference therebetween.

31. The RAN entity of claim 29, wherein the second beam quality metric vector comprises the SINR vector.

32. The RAN entity of claim 29, wherein the second beam quality metric vector comprises the delay spread vector.

33. A non-transitory computer-readable medium having stored therein instructions executable by one or more processors of a user equipment (UE) to:
receive each transmit beam of a plurality of transmit beams from a corresponding one of a plurality of transmission and reception points (TRPs) on each of a plurality of receive beams of the UE;

for each of the plurality of transmit beams, obtain a beam quality metric on each of the plurality of receive beams during a measurement period to generate a respective beam quality metric vector for each of the plurality of transmit beams, the beam quality metric comprises at least one of a reference signal received power (RSRP), signal-to-interference-plus-noise ratio (SINR), or delay spread; and transmit, to a radio access network (RAN) entity associated with the plurality of TRPs, a beam report comprising the respective beam quality metric vector for each of the plurality of transmit beams, the beam report comprising a respective first beam quality metric vector for each of the plurality of transmit beams and a respective second beam quality metric vector for each of the plurality of transmit beams, the first beam quality metric vector comprising an RSRP vector and the second beam quality metric vector comprising one of an SINR vector or a delay spread vector.

34. The non-transitory computer-readable medium of claim 33, further comprising instructions executable by the one or more processors of the UE to:

receive at least two streams from different respective TRPs of the plurality of TRPs using at least two corresponding beam pair links, each comprising a respective transmit beam of the plurality of transmit beams and a respective receive beam of the plurality of receive beams, selected based on the beam report for spatial division multiplexing of the at least two streams.

35. The non-transitory computer-readable medium of claim 33, further comprising instructions executable by the one or more processors of the UE to:

for each of the plurality of transmit beams, obtain the beam quality metric on each of the plurality of receive beams in parallel during the measurement period to generate the respective beam quality metric vector for each of the plurality of transmit beams.

36. The non-transitory computer-readable medium of claim 33, further comprising instructions executable by the one or more processors of the UE to:

for each of the plurality of transmit beams, obtain the beam quality metric on each of the plurality of receive beams serially during the measurement period to generate the respective beam quality metric vector for each of the plurality of transmit beams.

37. The non-transitory computer-readable medium of claim 33, wherein the beam quality metric comprises the RSRP and the SINR and the second beam quality metric vector comprises the SINR vector.

38. The non-transitory computer-readable medium of claim 33, wherein the beam quality metric comprises the RSRP and the delay spread and the second beam quality metric vector comprises the delay spread vector.

39. A non-transitory computer-readable medium having stored therein instructions executable by one or more processors of a radio access network (RAN) entity to:

transmit each of a plurality of transmit beams from a corresponding one of a plurality of transmission and reception points (TRPs) associated with the RAN entity to a user equipment (UE);

receive a beam report from the UE, the beam report comprising, for each of the plurality of transmit beams, a respective beam quality metric vector comprising a respective beam quality metric obtained in parallel on each of a plurality of receive beams of the UE, the respective beam quality metric vector comprising at least one of a reference signal received power (RSRP) vector, signal-to-interference-plus-noise ratio (SINR) vector, or delay spread vector, the beam report comprising a respective first beam quality metric vector for each of the plurality of transmit beams and a respective second beam quality metric vector for each of the plurality of transmit beams, the first beam quality metric vector comprising an RSRP vector and the second beam quality metric vector comprising one of an SINR vector or a delay spread vector; and select at least two beam pair links, each comprising a respective transmit beam of the plurality of transmit beams and a respective receive beam of the plurality of receive beams and each associated with a different respective TRP of the plurality of TRPs, to spatial division multiplex at least two streams to the UE based on the beam report.

40. The non-transitory computer-readable medium of claim 39, wherein the RSRP vectors for each of the plurality of transmit beams indicate a respective mutual interference between each of the plurality of transmit beams, and further comprising instructions executable by the one or more processors of the RAN entity to:

select the at least two beam pair links comprising a minimum mutual interference therebetween.

41. The non-transitory computer-readable medium of claim 39, wherein the second beam quality metric vector comprises the SINR vector.

42. The non-transitory computer-readable medium of claim 39, wherein the second beam quality metric vector comprises the delay spread vector.

43. A method for wireless communication at a user equipment (UE) in a wireless communication network, the method comprising:

receiving each transmit beam of a plurality of transmit beams from a corresponding one of a plurality of transmission and reception points (TRPs) on each of a plurality of receive beams of the UE;

for each of the plurality of transmit beams, obtaining a beam quality metric on each of the plurality of receive beams during a measurement period to produce a respective beam quality metric vector for each of the plurality of transmit beams;

transmitting, to a radio access network (RAN) entity associated with the plurality of TRPs, a beam report comprising the respective beam quality metric vector for each of the plurality of transmit beams; and receiving at least two streams from different respective TRPs of the plurality of TRPs using at least two corresponding beam pair links, each comprising a respective transmit beam of the plurality of transmit beams and a respective receive beam of the plurality of receive beams, selected based on the beam report to spatial division multiplex the at least two streams.

44. The method of claim 43, wherein the beam quality metric comprises a reference signal received power (RSRP) and each of the respective beam quality metric vectors comprises an RSRP vector, the RSRP vectors for each of the plurality of transmit beams indicate a respective mutual interference between each of the plurality of transmit beams.

45. The method of claim 43, wherein the beam report comprises a respective first beam quality metric vector for each of the plurality of transmit beams and a respective second beam quality metric vector for each of the plurality of transmit beams, the first beam quality metric vector comprises a reference signal received power (RSRP) vector and the second beam quality metric vector comprises one of a signal-to-interference-plus-noise ratio (SINR) vector or a delay spread vector.

46. The method of claim 43, wherein the obtaining the beam quality metric on each of the plurality of receive beams during the measurement period comprises:
for each of the plurality of transmit beams, obtaining the beam quality metric on each of the plurality of receive beams in parallel during the measurement period to generate the respective beam quality metric vector for each of the plurality of transmit beams.

47. The method of claim 43, wherein the obtaining the beam quality metric on each of the plurality of receive beams during the measurement period comprises:
for each of the plurality of transmit beams, obtaining the beam quality metric on each of the plurality of receive beams serially during the measurement period to generate the respective beam quality metric vector for each of the plurality of transmit beams.

48. A user equipment (UE) configured for wireless communication, comprising:
a processor; and
a memory coupled to the processor, the processor being configured to:
receive each transmit beam of a plurality of transmit beams from a corresponding one of a plurality of transmission and reception points (TRPs) on each of a plurality of receive beams of the UE;
for each of the plurality of transmit beams, obtain a beam quality metric on each of the plurality of receive beams during a measurement period to produce a respective beam quality metric vector for each of the plurality of transmit beams;
transmit, to a radio access network (RAN) entity associated with the plurality of TRPs, a beam report comprising the respective beam quality metric vector for each of the plurality of transmit beams; and
receive at least two streams from different respective TRPs of the plurality of TRPs using at least two corresponding beam pair links, each comprising a respective transmit beam of the plurality of transmit beams and a respective receive beam of the plurality of receive beams, selected based on the beam report to spatial division multiplex the at least two streams.

49. The UE of claim 48, wherein the beam quality metric comprises a reference signal received power (RSRP) and each of the respective beam quality metric vectors comprises an RSRP vector, the RSRP vectors for each of the plurality of transmit beams indicate a respective mutual interference between each of the plurality of transmit beams.

50. The UE of claim 48, wherein the beam report comprises a respective first beam quality metric vector for each of the plurality of transmit beams and a respective second beam quality metric vector for each of the plurality of transmit beams, the first beam quality metric vector comprises a reference signal received power (RSRP) vector and the second beam quality metric vector comprises one of a signal-to-interference-plus-noise ratio (SINR) vector or a delay spread vector.

51. The UE of claim 48, further comprising:
a transceiver coupled to the processor, wherein the processor is further configured to:
for each of the plurality of transmit beams, obtain the beam quality metric on each of the plurality of receive beams in parallel during the measurement period to generate the respective beam quality metric vector for each of the plurality of transmit beams.

52. The UE of claim 48, wherein the processor is further configured to:
for each of the plurality of transmit beams, obtain the beam quality metric on each of the plurality of receive beams serially during the measurement period to generate the respective beam quality metric vector for each of the plurality of transmit beams.

53. A non-transitory computer-readable medium having stored therein instructions executable by one or more processors of a user equipment (UE) to:
receive each transmit beam of a plurality of transmit beams from a corresponding one of a plurality of transmission and reception points (TRPs) on each of a plurality of receive beams of the UE;
for each of the plurality of transmit beams, obtain a beam quality metric on each of the plurality of receive beams during a measurement period to produce a respective beam quality metric vector for each of the plurality of transmit beams;
transmit, to a radio access network (RAN) entity associated with the plurality of TRPs, a beam report comprising the respective beam quality metric vector for each of the plurality of transmit beams; and
receive at least two streams from different respective TRPs of the plurality of TRPs using at least two corresponding beam pair links, each comprising a respective transmit beam of the plurality of transmit beams and a respective receive beam of the plurality of receive beams, selected based on the beam report to spatial division multiplex the at least two streams.

54. The non-transitory computer-readable medium of claim 53, wherein the beam quality metric comprises a reference signal received power (RSRP) and each of the respective beam quality metric vectors comprises an RSRP vector, the RSRP vectors for each of the plurality of transmit beams indicate a respective mutual interference between each of the plurality of transmit beams.

55. The non-transitory computer-readable medium of claim 53, wherein the beam report comprises a respective first beam quality metric vector for each of the plurality of transmit beams and a respective second beam quality metric vector for each of the plurality of transmit beams, the first beam quality metric vector comprises a reference signal received power (RSRP) vector and the second beam quality metric vector comprises one of a signal-to-interference-plus-noise ratio (SINR) vector or a delay spread vector.

56. The non-transitory computer-readable medium of claim 53, further comprising instructions executable by the one or more processors of the UE to:
for each of the plurality of transmit beams, obtain the beam quality metric on each of the plurality of receive beams in parallel during the measurement period to generate the respective beam quality metric vector for each of the plurality of transmit beams.

57. The non-transitory computer-readable medium of claim 53, further comprising instructions executable by the one or more processors of the UE to:
for each of the plurality of transmit beams, obtain the beam quality metric on each of the plurality of receive beams serially during the measurement period to generate the respective beam quality metric vector for each of the plurality of transmit beams.

58. A method for wireless communication at a radio access network (RAN) entity in a wireless communication network, the method comprising:
- providing each of a plurality of transmit beams from a corresponding one of a plurality of transmission and reception points (TRPs) associated with the RAN entity;
- receiving a beam report of the UE, the beam report comprising, for each of the plurality of transmit beams, a respective beam quality metric vector comprising a respective beam quality metric obtained during a measurement period on each of a plurality of receive beams of the UE;
- selecting at least two beam pair links, each comprising a respective transmit beam of the plurality of transmit beams and a respective receive beam of the plurality of receive beams and each associated with a different respective TRP of the plurality of TRPs, for spatial division multiplexing of at least two streams to the UE based on the beam report; and
- providing at least two streams from different respective TRPs of the plurality of TRPs using at least two corresponding beam pair links, each comprising a respective transmit beam of the plurality of transmit beams and a respective receive beam of the plurality of receive beams, selected based on the beam report to spatial division multiplex the at least two streams.

59. The method of claim 58, wherein the respective beam quality metric vector comprises a reference signal received power (RSRP) vector and the RSRP vectors for each of the plurality of transmit beams indicate a respective mutual interference between each of the plurality of transmit beams, and wherein selecting the at least two transmit beams further comprises:
- selecting the at least two beam pair links comprising a minimum mutual interference therebetween.

60. The method of claim 58, wherein the beam report comprises a respective first beam quality metric vector for each of the plurality of transmit beams and a respective second beam quality metric vector for each of the plurality of transmit beams the first beam quality metric vector comprises a reference signal received power (RSRP) vector and the second beam quality metric vector comprises one of a signal-to-interference-plus-noise ratio (SINR) vector or a delay spread vector.

61. A radio access network (RAN) entity configured for wireless communication, comprising:
- a processor; and
- a memory coupled to the processor, the processor being configured to:
  - provide each of a plurality of transmit beams from a corresponding one of a plurality of transmission and reception points (TRPs) associated with the RAN entity;
  - receive a beam report of the UE, the beam report comprising, for each of the plurality of transmit beams, a respective beam quality metric vector comprising a respective beam quality metric obtained during a measurement period on each of a plurality of receive beams of the UE;
  - select at least two beam pair links, each comprising a respective transmit beam of the plurality of transmit beams and a respective receive beam of the plurality of receive beams and each associated with a different respective TRP of the plurality of TRPs, for spatial division multiplexing of at least two streams to the UE based on the beam report; and
  - provide at least two streams from different respective TRPs of the plurality of TRPs using at least two corresponding beam pair links, each comprising a respective transmit beam of the plurality of transmit beams and a respective receive beam of the plurality of receive beams, selected based on the beam report to spatial division multiplex the at least two streams.

62. The RAN entity of claim 61, further comprising:
- a transceiver coupled to the processor, wherein the respective beam quality metric vector comprises a reference signal received power (RSRP) vector and the RSRP vectors for each of the plurality of transmit beams indicate a respective mutual interference between each of the plurality of transmit beams, and wherein the processor is further configured to:
- select the at least two beam pair links comprising a minimum mutual interference therebetween.

63. The RAN entity of claim 61, wherein the beam report comprises a respective first beam quality metric vector for each of the plurality of transmit beams and a respective second beam quality metric vector for each of the plurality of transmit beams the first beam quality metric vector comprises a reference signal received power (RSRP) vector and the second beam quality metric vector comprises one of a signal-to-interference-plus-noise ratio (SINR) vector or a delay spread vector.

64. A non-transitory computer-readable medium having stored therein instructions executable by one or more processors of a radio access network (RAN) entity to:
- provide each of a plurality of transmit beams from a corresponding one of a plurality of transmission and reception points (TRPs) associated with the RAN entity;
- receive a beam report of the UE, the beam report comprising, for each of the plurality of transmit beams, a respective beam quality metric vector comprising a respective beam quality metric obtained during a measurement period on each of a plurality of receive beams of the UE;
- select at least two beam pair links, each comprising a respective transmit beam of the plurality of transmit beams and a respective receive beam of the plurality of receive beams and each associated with a different respective TRP of the plurality of TRPs, for spatial division multiplexing of at least two streams to the UE based on the beam report; and
- provide at least two streams from different respective TRPs of the plurality of TRPs using at least two corresponding beam pair links, each comprising a respective transmit beam of the plurality of transmit beams and a respective receive beam of the plurality of receive beams, selected based on the beam report to spatial division multiplex the at least two streams.

65. The non-transitory computer-readable medium of claim 64, wherein the respective beam quality metric vector comprises a reference signal received power (RSRP) vector and the RSRP vectors for each of the plurality of transmit beams indicate a respective mutual interference between each of the plurality of transmit beams, and further comprising instructions executable by the one or more processors of the RAN entity to:
- select the at least two beam pair links comprising a minimum mutual interference therebetween.

66. The non-transitory computer-readable medium of claim 64, wherein the beam report comprises a respective first beam quality metric vector for each of the plurality of transmit beams and a respective second beam quality metric vector for each of the plurality of transmit beams the first beam quality metric vector comprises a reference signal received power (RSRP) vector and the second beam quality metric vector comprises one of a signal-to-interference-plus-noise ratio (SINR) vector or a delay spread vector.

* * * * *